(12) United States Patent
Barchers

(10) Patent No.: US 7,402,785 B2
(45) Date of Patent: Jul. 22, 2008

(54) SYSTEM AND METHOD FOR CORRECTION OF TURBULENCE EFFECTS ON LASER OR OTHER TRANSMISSION

(75) Inventor: Jeffrey Daniel Barchers, Longmont, CO (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 11/341,564

(22) Filed: Jan. 30, 2006

(65) Prior Publication Data

US 2007/0176077 A1 Aug. 2, 2007

(51) Int. Cl.
*G01J 1/20* (2006.01)
*G01B 11/02* (2006.01)

(52) U.S. Cl. .................. 250/201.9; 356/512; 356/515

(58) Field of Classification Search ............. 250/201.9; 356/512–516
See application file for complete search history.

(56) References Cited

U.S. PATENT DOCUMENTS

| 5,493,391 | A | * | 2/1996 | Neal et al. | ........... | 356/121 |
| 5,676,147 | A | * | 10/1997 | Petrofsky et al. | ........... | 600/447 |
| 6,163,381 | A | * | 12/2000 | Davies et al. | ........... | 356/521 |
| 6,220,707 | B1 | | 4/2001 | Bille | | |
| 6,366,356 | B1 | * | 4/2002 | Brosnan et al. | ........... | 356/477 |
| 6,620,707 | B1 | * | 9/2003 | Heimann et al. | ........... | 438/469 |
| 6,784,408 | B1 | | 8/2004 | Cheung et al. | | |
| 6,818,876 | B1 | * | 11/2004 | Pringle, Jr. | ........... | 250/201.9 |
| 6,987,255 | B2 | * | 1/2006 | Smith | ........... | 250/201.9 |
| 7,092,103 | B1 | * | 8/2006 | Kendrick et al. | ........... | 356/497 |
| 7,161,128 | B2 | * | 1/2007 | Wirth | ........... | 250/201.9 |
| 2005/0045801 | A1 | | 3/2005 | Smith | | |
| 2005/0098707 | A1 | | 5/2005 | Wirth | | |
| 2005/0105044 | A1 | * | 5/2005 | Warden et al. | ........... | 351/159 |

OTHER PUBLICATIONS

T.A. Rhoadarmer, "Development of a Self-referencing Interferometer Wavefront Sensor", Advanced Wavefront Control: Methods, Devices and Applications II, John D. Gonglewski, et al., Proceedings of SPIE vol. 5553, Oct. 2004, pp. 112-126.

(Continued)

*Primary Examiner*—Thanh X Luu
*Assistant Examiner*—Brian J Livedalen
(74) *Attorney, Agent, or Firm*—Banner & Witcoff, Ltd.

(57) ABSTRACT

An incoming laser beam is relayed to a steering mirror and a phase correction device. The beam is relayed from the phase correction device to a focal plane array and to a wavefront sensor (WFS). Low order steering mirror tilt corrections can be based on data from the focal plane array. The WFS outputs data on multiple channels to a field programmable gate array (FPGA), with each of the WFS channels corresponding to a subaperture of the beam wavefront. The FPGA calculates phase corrections for each of the subapertures and forwards those corrections to the phase correction device. The FPGA also calculates tilts for the steering mirror based on the WFS output data, which tilts can be used instead of tilts based on focal plane array data. The phase corrections may be based on modulo $2\pi$ phase error calculations and/or modal phase error calculations.

17 Claims, 23 Drawing Sheets

OTHER PUBLICATIONS

J.W. Hardy, et al., "Real-time Atmospheric Compensation," *J. Opt. Soc. Am*, 67:360-369, 1977.

J.C. Wyant, "Use of an AC Heterodyne Lateral Shear Interferometer with Real-time Wavefront Correction Systems," *Applied Optics*, 14:2622-2626, 1975.

T.R. O'Meara, "The Multidither Principle in Adaptive Optics," *J. Opt. Soc. Am*, 67:306-315, 1977.

D.Y. Gezari, et al., "Speckle Interferometry: Diffraction-Limited Measurements of Nine Stars with the 200-inch Telescope," *Astrophys. J*, 173:L1-L5, 1972.

K.T. Knox, et al., "Recovery of Images from Atmospherically Degraded Short-Exposure Photographs," *Astrophys. J.*, 193:L45-L48, 1974.

C.A. Primmerman, et al., "Compensation of Atmospheric Optical Distortion Using a Synthetic Beacon," *Nature*, 353:141-143, 1991.

R.Q. Fugate, et al., "Measurement of Atmospheric Wavefront Distortion Using Scattered Light from a Laser Guide Star," *Nature*, 353:144-146, 1991.

J.M. Spinhime, et al., "The Starfire Optical Range 3.5-m Telescope Adaptive Optical System," in *Adaptive Optical Systems and Technologies*, D. Bonaccini, ed., Proc. SPIE 3353:22-33, 1998.

J.C. Shelton, et al., "First Tests of the Cassegrain Adaptive Optics System of the Mount Wilson 100-inch Telescope," *Adaptive Optical Systems and Technologies*, R.K. Tyson and R.Q. Fugate, eds., Proc. SPIE 2534:72-77, 1995.

J.D. Barchers, et al., "Evaluation of the Performance of Hartmann Sensors in Strong Scintillation," *Applied Optics*, 41:1012-1021, 2002.

J.D. Barchers, et al., "Evaluation of the Performance of a Shearing Interferometer in Strong Scintillation in the Absence of Additive Measurement Noise," *Applied Optics*, 41:3674-3683, 2002.

J.D. Barchers, et al., "Evaluation of Phase Shifting Approaches for a Point Diffraction Interferometer Using the Mutual Coherence Function," *Applied Optics*, 41:7499-7514.

J.D. Barchers, et al., "The Performance of Wavefront Sensors in Strong Scintillation," SPIE Proc. Hawaii 2002 (In Press).

D.L. Fried, et al., "Branch Cuts in the Phase Function," *Applied Optics* 31:2865-2882, 1992.

D.L. Fried, "Branch Point Problem in Adaptive Optics," *J. Opt. Soc. Am. A* 15:2759-2768, 1998.

G.A. Tyler, "Reconstruction and Assessment of the Least Squares and Slope Discrepancy Components of the Phase," *J. Opt. Soc. Am. A* 17:1828-1839.

A. Greenaway, et al., "Adaptive Optics Reveals its Commercial Potential," *Laser Focus World*, downloaded from <http://lfw.pennnet.com>, published prior to Apr. 29, 2005, 4 pages.

Oslik, "Adaptive Optics Industry Finds New Markets Through MEMS," Nanotechnology News Network, downloaded from <http://www.nanonewsnet.com>, published prior to Apr. 29, 2005, 5 pages.

"Telescopes and Beam Control," Goodrich, <http://www.oss.goodrich.com/TelescopesAndBeamControl.shtml>, first date of publication believed to be prior to Apr. 29, 2005, 2 pages.

N. Savage, "A Clearer View, Wavefront Sensors Bend Adaptive Optics Techniques to New Uses," The SPIE Magazines of Photonics Technologies and Applications, published prior to Apr. 29, 2005, 3 pages.

G. Haas, "Adaptive Optics," *Industrial Laser Solutions*, downloaded from <http://ils.pennnet.com>, published prior to Apr. 29, 2005, 4 pages.

J. Wallace, "Phase-Unwrapping Algorithm Shrugs Off Noise," *Laser Focus World*, downloaded from <http://lfw.pennnet.com>, published prior to Apr. 29, 2005, 4 pages.

A. Scott, "Smart Sensing, Combining a Specialized Grating and Short-Focal-Length Lens Yields a Smart Sensor for Wavefront Sensing and Beam Characterization," SPIE's *oe* Magazine, pp. 25-28, Oct. 2004.

"Adaptive Optics Tutorial," adaptiveOptics.com, <http://www.aoainc.com/technologies/adaptiveandmicrooptics/aostutorial.html>, published prior to Apr. 29, 2005, 5 pages.

International Search Report and Written Opinion for PCT/US07/00543 dated Mar. 19, 2008.

"Results of Atmospheric Compensation Using a Wavefront Curvature-Based Adaptive Optics System," Erry, Gavin R.G., et al., Optics in Atomspheric propagation and Adaptive Systems V., Proceedings of the SPIE, vol. 4884, pp. 245-249 (2003).

Weyrauch, T., et al., "Adaptive Optics Systems with Micromachined Mirror Array and Stochastic Gradient Descent Controller," Proceedings of SPIE - The International Society for Optical Engineering Proceedings of the 2000; High-Resolution Wavefront Control: Methods, Devices, and Applcations, vol. 4124, pp. 178-188, Aug. 2000.

M.A. Vorontsov, et al., "Adaptive Phase-Distortion Correction Based on Parallel Gradient Descent Optimization," Opt. Lett., vol. 22, No. 12, pp. 907-909, Jun. 15, 1997.

M.A. Vorontsov et al., "Stochastic Parallel Gradient Descent Technique for High-Resolution Wavefront Phase Distortion Correction," *J. Opt. Soc. Am. A.*, vol. 15, No. 10, pp. 2745-2758, Oct. 1998.

"Fiber Coupling with Adaptive Optics for Free-Space Optical Communication," Thomas Weyrauch, et al., Free-Space Laser Communication and Laser Imaging, Proceedings of SPIE vol. 4489, pp. 177-184, 2002.

"Atmospheric Propagation Characteristics of Highest Importance to Commercial Free Space Optics," Eric Korevaar, et al., MRV Communications, Atmospheric Propagation, Proceedings of SPIE, vol. 4976, 12 pages, 2003.

"Closed-Loop Control for Adaptive Optics Wavefront Compensation in Highly Scintillated Conditions," David R. Gerwe, et al., Laser Systems Technology, Proceedings of the SPIE, vol. 5087, pp. 87-102, 2003.

\* cited by examiner $$G = \begin{bmatrix} -1 & 0 & 0 & 1 & 0 & 0 & 0 & 0 & 0 \\ 0 & -1 & 0 & 0 & 1 & 0 & 0 & 0 & 0 \\ 0 & 0 & -1 & 0 & 0 & 1 & 0 & 0 & 0 \\ 0 & 0 & 0 & -1 & 0 & 0 & 1 & 0 & 0 \\ 0 & 0 & 0 & 0 & -1 & 0 & 0 & 1 & 0 \\ 0 & 0 & 0 & 0 & 0 & -1 & 0 & 0 & 1 \\ -1 & 1 & 0 & 0 & 0 & 0 & 0 & 0 & 0 \\ 0 & -1 & 1 & 0 & 0 & 0 & 0 & 0 & 0 \\ 0 & 0 & 0 & -1 & 1 & 0 & 0 & 0 & 0 \\ 0 & 0 & 0 & 0 & -1 & 1 & 0 & 0 & 0 \\ 0 & 0 & 0 & 0 & 0 & 0 & -1 & 1 & 0 \\ 0 & 0 & 0 & 0 & 0 & 0 & 0 & -1 & 1 \end{bmatrix}$$

FIG. 9B

Beacon

Reference (1)  (2)  (3)  (4)

SYSTEM AND METHOD FOR CORRECTION OF TURBULENCE EFFECTS ON LASER OR OTHER TRANSMISSION

BACKGROUND

There are numerous applications (or potential applications) in which it would be useful to transmit a laser beam over relatively long distances. For example, a laser beam transmitted through free space could be used for communication purposes. Such communications could potentially be horizontal (e.g., entirely within the atmosphere) or vertical (e.g., from ground to an orbiting satellite). As another example, laser detection and ranging (LADAR) could be used for three-dimensional imaging and mapping at long ranges. As yet another example, laser Doppler velocimetry could be useful for tracking objects over long distances.

When transmitting a laser over long distances through the atmosphere, atmospheric turbulence causes significant problems. Atmospheric turbulence leads to random fluctuations in the air density which leads to random fluctuations in refractive index. The random fluctuations in the refractive index in turn induce phase fluctuations on a laser beam propagating through turbulent air. Phase fluctuations lead to two categories of effects. The first category of effects is phase fluctuations. Over any distance, phase fluctuations degrade image quality, reducing the ability of an optical system to image through turbulence. Phase fluctuations can also degrade the ability of a communication system because the received beam must be focused onto a detector or into a single mode fiber. The second category of effects is optical scintillation. Over long propagation distances, phase aberrations lead to intensity fluctuations—referred to as scintillation. One example of scintillation is the "twinkling" of stars in the night sky. A second example is that for a laser beam propagating through turbulence, the phase aberrations along the path lead to a random de-focusing and break-up of the beam, making the beam focus poorly at the desired location. One of the phenomena associated with optical scintillation is the appearance of branch points in the phase function, which occur when the optical field has a null value due to optical scintillation. Branch points in the phase function can degrade the performance of methods that have been developed to correct for the impact of phase aberrations on systems designed for imaging and propagation through turbulence.

Various efforts have been made to develop adaptive optical (AO) systems that compensate for the effects of atmospheric turbulence on laser propagation. In general "adaptive optics" is a blanket name for technologies to improve quality of images obtained through a turbulent optical path and/or precompensate a laser beam for propagation through a turbulence optical path. Known AO systems have various limitations. Most known AO systems employ a Hartmann sensor to measure phase variations in a laser beam wavefront to develop commands to be applied to a deformable mirror to correct and cancel the phase aberrations. Hartmann sensor systems are incapable of correcting the branch point contribution to the phase function that is caused by strong scintillation. Other proposed systems employ a self-referencing interferometer (SRI) as a wavefront sensor. These systems generally require full "unwrapping" of the phase (i.e., calculating a phase change through numerous multiples of $2\pi$). Moreover, the best known control system to work with SRI wavefront sensor technology requires four wavefront sensor apertures for each channel of a phase correcting device such as a deformable mirror. This results in a computational complexity on the order $N^2$, where N is the number of phase correcting device control channels.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An AO system according to at least some embodiments includes a steering mirror receiving an incoming laser beam through a telescope aperture. The beam is then relayed to a phase correction device. The phase correction device includes multiple phase correction elements that each induce phase corrections in a different wavefront subaperture (i.e., a different part of the incoming beam cross-section). The incoming beam is relayed from the phase correction device to a focal plane array and to a wavefront sensor (WFS). Based on the centroid of an image formed on the focal plane array by the incoming beam, tilt corrections can be generated for the steering mirror. The WFS includes a plurality of output channels, with each of the WFS output channels corresponding to one of the wavefront subapertures. Data from the WFS is provided to a field programmable gate array (FPGA) over the WFS output channels. The FPGA then calculates phase corrections for each of the wavefront subapertures and forwards those corrections to the phase correction device. The FPGA may also calculate tilts for the steering mirror based on the WFS output data.

In some embodiments, the phase corrections are based on phase errors calculated modulo $2\pi$. In other embodiments, data from the subapertures is combined to form a low order modal decomposition of the phase function. The low order modal decomposition of the phase is then used to calculate a low order phase correction, which is added to a phase correction based on the modulo $2\pi$ phase error calculation.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9B is a shearing geometry influence function matrix G for the 3×3 array of FIG. 9A.

DETAILED DESCRIPTION

Figure 1A:
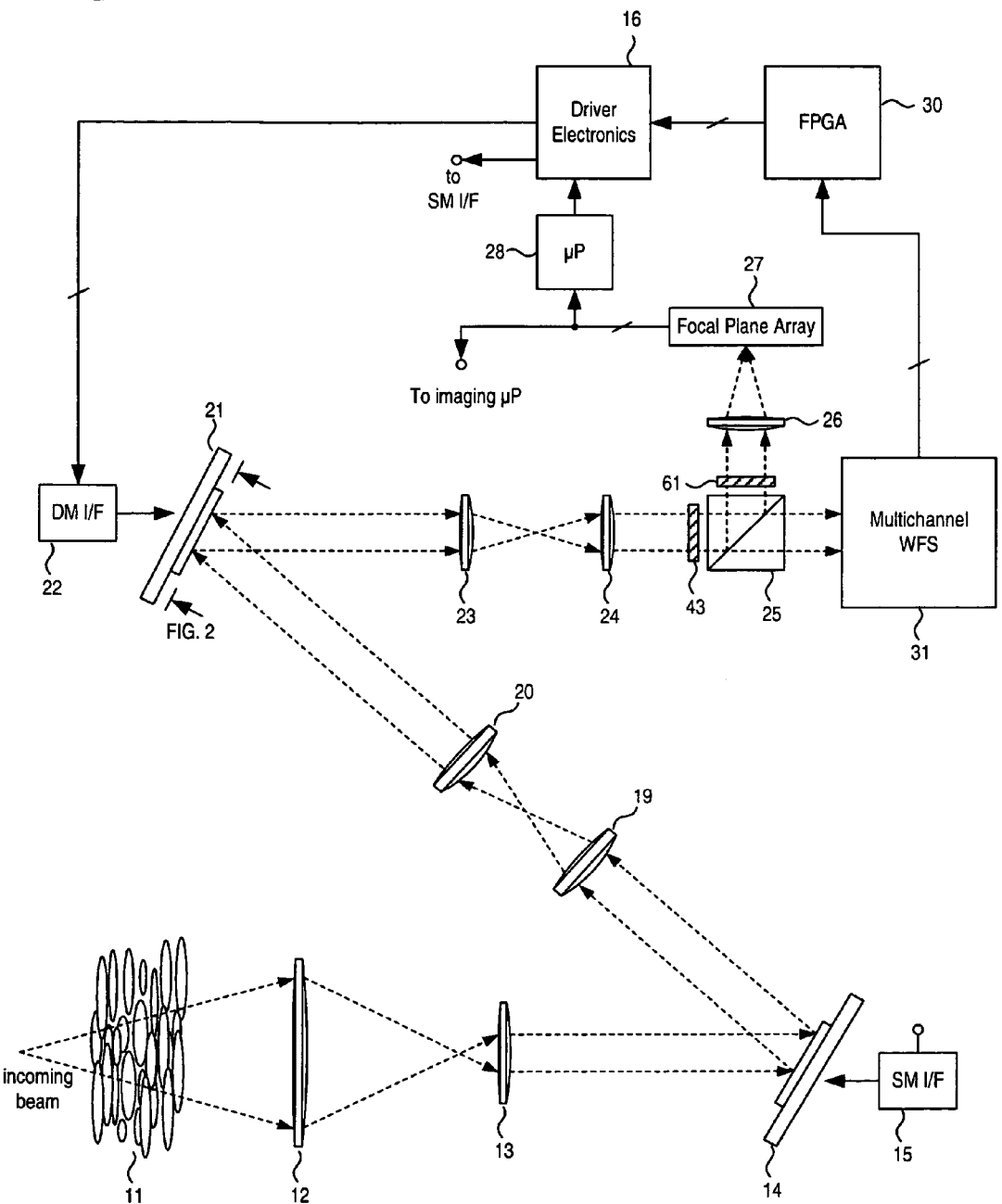
FIG. 1A is a block diagram of a direct phase control adaptive optical system according to at least some embodiments.

FIG. 1A is a block diagram of a direct phase control adaptive optical (DPCAO) system 10, according to at least some embodiments, which compensates for the effects of atmospheric turbulence on an incoming laser beam. In FIG. 1A and subsequent figures, and unless the context indicates otherwise, broken line arrows represent light beams and solid line arrows represent signal paths (or data flow).

Beginning at the lower left corner of FIG. 1A, light from a source (not shown) travels through atmospheric turbulence 11 and is received by a telescope aperture 12. This light is relayed by a lens 13 to the plane of a steering mirror (SM) 14. Steering mirror 14, which is only used to control tilts of the incoming beam in the embodiment of FIG. 1A, is controlled by a steering mirror interface (SM I/F) 15. In response to signals received from driver electronics 16 (described in more detail below), SM I/F 15 generates electrical signals that cause actuators to rotate SM 14 about x and y axes so as to track the incoming beam and correct for movements of that beam within aperture 12.

From SM 14, the incoming beam is relayed by lenses 19 and 20 to the plane of a phase correction device 21. Phase correction device 21 is, in at least some embodiments, a conventional continuous face sheet deformable mirror (DM). In other embodiments, phase correction device 21 is a MEMS technology continuous face sheet or segmented mirror. In still other embodiments, a liquid crystal phase correction device is used. Other types of devices suitable for modulating a wavefront phase may also be used. Phase correction devices in various described embodiments will subsequently be referred to as "DMs," although it is understood that other types of phase correction devices could be employed.

Figure 2:
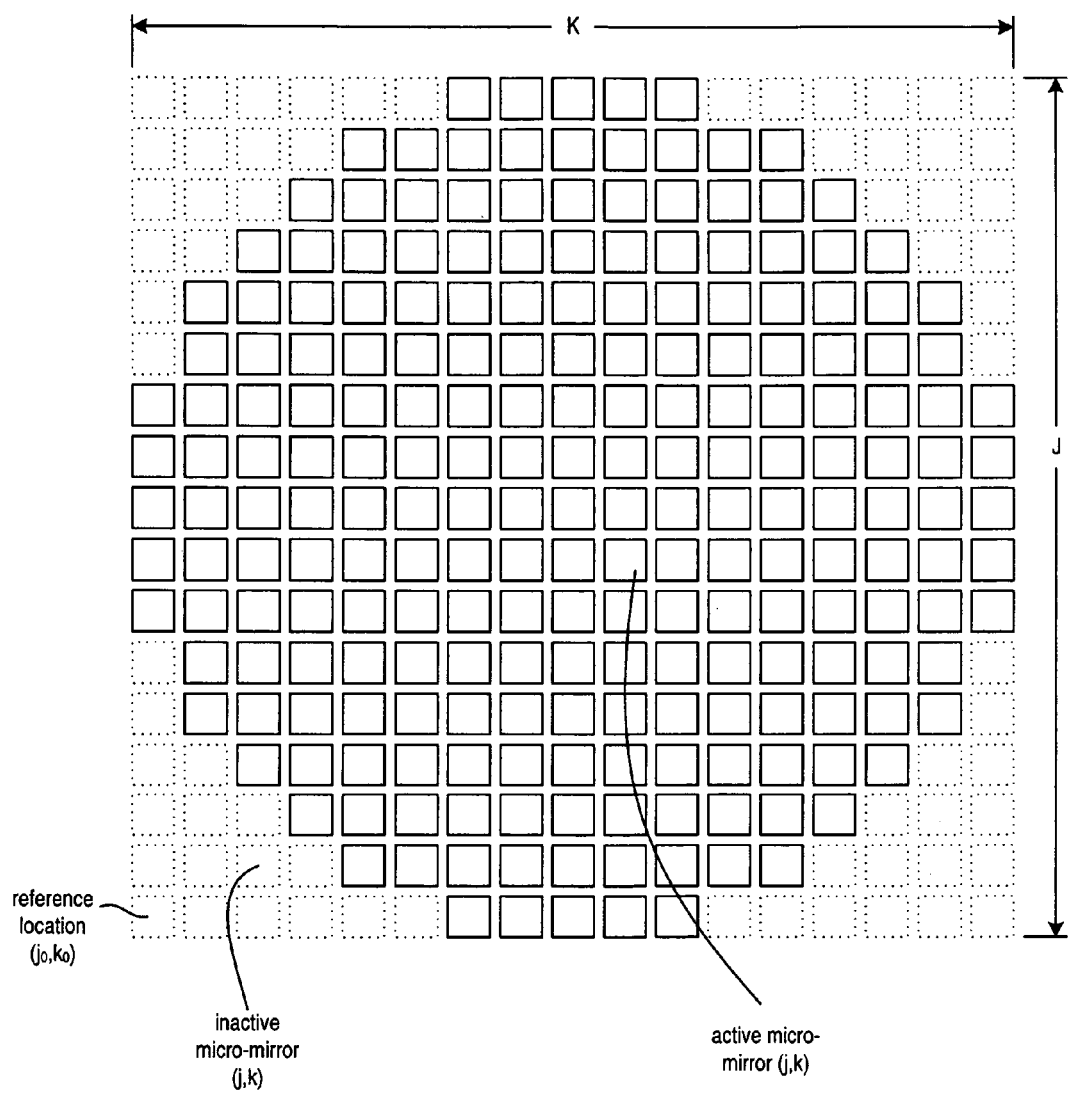
FIG. 2 is a view of a phase control device from the position indicated in FIG. 1A.

FIG. 2 is a view of DM 21 from the position indicated in FIG. 1A. The front surface of DM 21 includes a plurality of reflective micro-mirrors, shown in FIG. 2 as squares. Through micromechanical actuators (not shown), each micro-mirror can be rotated about multiple axes in the plane of the front surface of DM 21. By controlling the degree to which a particular micro-mirror is moved, the phase for the subaperture of the incoming beam wavefront reflected from that micro-mirror can be corrected. Each micro-mirror corresponds to a separate DM control channel. DM interface (DM I/F) 22 (FIG. 1A) receives data (e.g., a phase correction command) from driver electronics 16 over each control channel. For each control channel, DM I/F 22 then converts the received phase correction command into the electrical signals necessary to generate movement of a corresponding micro-mirror. The phase correction command on each channel is a phase error, and the corresponding micromirror is moved so as to remove that phase error. In other embodiments, the phase correction device does not use micro-mirrors. Instead, a continuous facesheet deformable mirror may use a plurality of actuators behind a thin continuous facesheet. By adjusting the position of the actuators, the phase on the facesheet is modulated. In still other embodiments, phase correction devices correct phase as a light beam travels through a transmissive region. In such embodiments, the data received on each control channel causes a phase correction device interface to alter the transmissive properties of a particular portion of the phase correction device transmissive region.

In the embodiment of FIG. 1A and FIG. 2, DM 21 has dimensions of J by K micro-mirrors. For purposes that will become apparent below, each micro-mirror is identified by row (j) and column (k) indices corresponding to an offset from an arbitrarily chosen reference position $(j_0, k_0)$. "Active" micro-mirrors of DM 21 are shown in solid lines, and "inactive" micro-mirrors are shown in dotted lines. In general, the concept of active and inactive micro-mirrors is a construct created to identify micro-mirrors that are actually being used. For example, a commercially available DM may have a square array of available micro-mirrors. If such a device is employed with a beam having a circular cross-section, and as will become clear in view of algorithms discussed below, it is useful to distinguish the active micro-mirrors (i.e., the micro-mirrors reflecting a subaperture of the beam) from the inactive micro-mirrors (the micro-mirrors not reflecting an appreciable subaperture of the beam).

From DM 21, and as shown in FIG. 1A, light is relayed through lenses 23 and 24 and half wave plate (HWP) 43 to polarizing beam splitter (PBS) 25. From PBS 25, a portion of the beam is then relayed via HWP 61 and lens 26 to a focal plane array 27. Array 27 includes multiple light sensitive elements (or pixels) which output a signal that varies in response to the intensity of received light. The output from these pixels is then used to generate an image based on the incoming beam. Data from array 27 can be used for acquisition (or fine track) control of SM 14. In particular, pixel data from array 27 is conveyed to an intermediate microprocessor 28. Using a linear filter control law (e.g., one of various known proportional integral control algorithms), microprocessor 28 determines the location on array 27 of the incoming light beam centroid. This centroid location is used to calculate the rotations of SM 14 about its axes (known as "tilts") necessary to compensate for tilt in the incoming beam. These tilts are forwarded from microprocessor 28 to driver electronics 16, which generates the appropriate commands for SM I/F 15. Similar to DM I/F 22, SM I/F 15 converts those commands into the electrical signals necessary to cause the desired movement of actuators in SM 14. As discussed in more detail below, an alternate method of tracking using tilts calculated from the wavefront sensor can be employed. In that alternate method, tilt measurements are separately calculated by field programmable gate array (FPGA) 30 and transmitted to driver electronics 16.

Another portion of the incoming beam is relayed from beam splitter 25 to self-referencing interferometer (SRI) wavefront sensor (WFS) 31. WFS 31 is used to measure the phase of the incoming beam at numerous subapertures (i.e., numerous locations across the beam cross-section). For each of those subapertures, WFS 31 outputs data on a separate channel. Moreover, and as discussed below, each channel of WFS 31 corresponds in a one-to-one manner to a control channel of DM 21. Various types of phase measuring interferometer wavefront sensors can be employed, including (but not limited to) a Zernike interferometer and a point diffraction interferometer. Temporal and spatial phase shifting interferometers can be used. A spatial phase shifting interferometer captures all pupil plane phase shift images in a single detector frame, while a temporal phase shifting interferometer captures images sequentially in time. Examples of a temporal SRI WFS and of a spatial SRI WFS are provided below.

System 10 has two control modes. In a low order (or acquisition) mode, and as described above, data from array 27 can be used to control SM 14. In a higher order mode, phase corrections from FPGA 30 are used to control DM 21. FPGA 30 calculates those phase corrections based on data received from WFS 31. FPGA 30 also calculates tilts for SM 14, based on data from WFS 31, as part of calculating phase corrections. In alternate embodiments, those tilts calculated by FPGA 30 are used (instead of centroid-based tilts from array 27 data) as the tilt commands for SM 14. The output of FPGA 30 is collected, formatted and/or amplified by driver electronics 16 and forwarded to DM I/F 22. If the tilts calculated by FPGA 30 are also used for low order control, those tilts from FPGA 30 are sent to SM I/F 15 via driver electronics 16.

In order to generate phase corrections and tilts, FPGA 30 computes phase errors for multiple subapertures of the incoming beam using data from WFS 31. As to each channel of WFS 31, FPGA 30 initially performs a divide-free phase error computation. After that initial computation, values for certain components (e.g., piston and tilts computed from a previous frame of data) are subtracted from the initially computed phase error. The phase error on each WFS/DM channel is then temporally filtered for stability and to avoid amplifying noise. After temporal filtering, the phase error for each channel is wrapped with a hysteresis to avoid non-linear limit cycling. By computing phase errors using values for piston and tilt computed from a previous frame, the entire control process from detector array 56 read-out to application of commands to DM 21 can be one-to-one. Notably, each WFS channel corresponds to a single DM control channel, and a phase error computed for a channel of WFS 31 applies to the subaperture affected by the micro-mirror (or other control element) controlled by the corresponding control channel of DM 21. This allows parallel computations for all channels in FPGA 30. Further details of computations performed within FPGA 30 for each channel are described in more detail below.

Figure 1B:
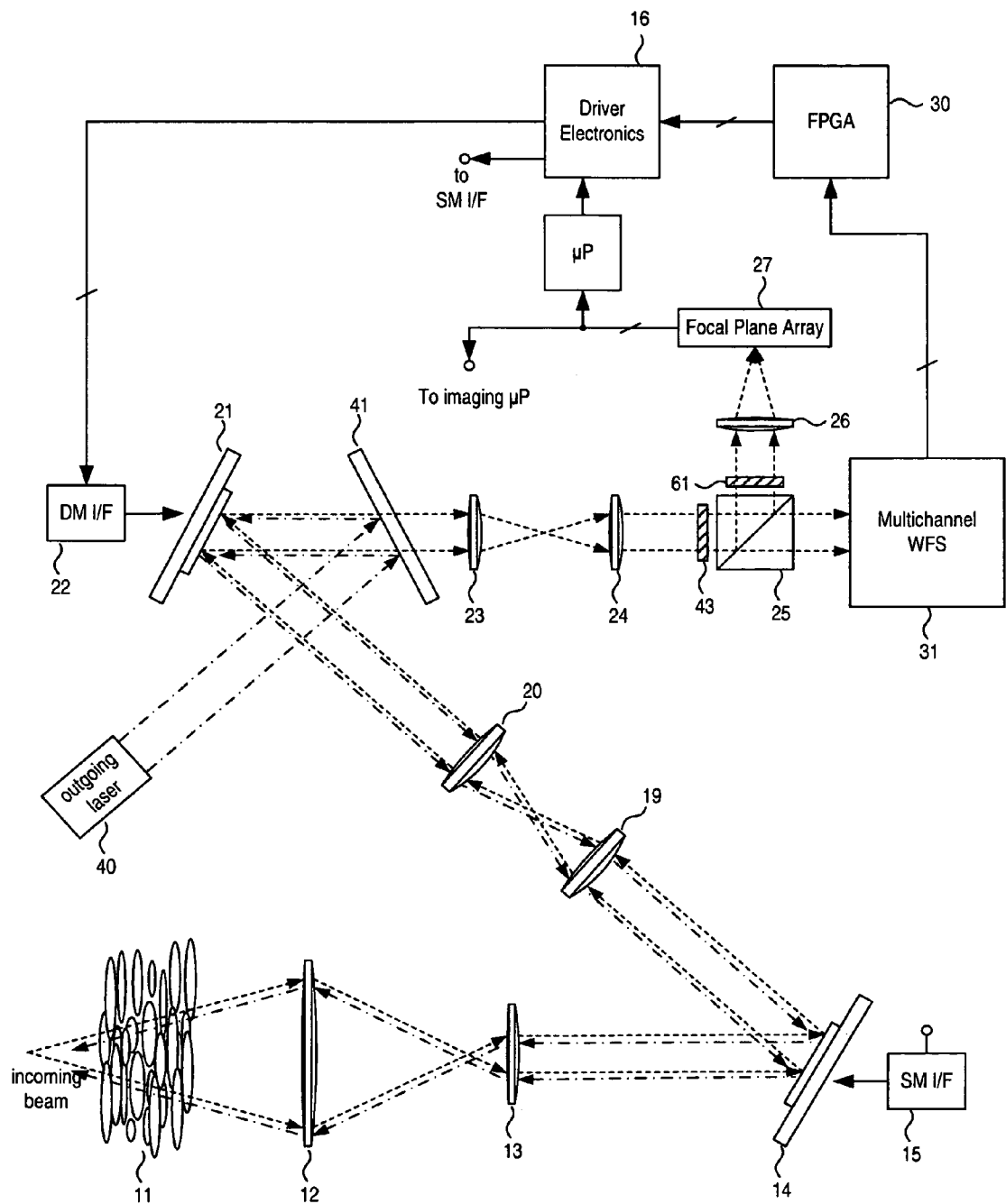
FIG. 1B is a block diagram of a direct phase control adaptive optical system similar to that of FIG. 1A, but which also provides turbulence precompensation in an outgoing laser beam.

FIG. 1B is a block diagram of a DPCAO system 10' according to at least some additional embodiments. Like components have similar reference numbers in FIGS. 1A and 1B, and system 10' compensates for the effects of atmospheric turbulence on an incoming laser beam in the same manner as system 10. However, system 10' is further configured to pre-compensate for atmospheric turbulence in an outgoing laser beam. Specifically, an outgoing laser beam (shown as an uneven broken line arrow) emanates from a source 40. The outgoing beam may be modulated for, e.g., communication purposes. If the outgoing beam is being transmitted to the sender of an incoming beam for which a phase correction has been calculated, the outgoing beam will be traveling through the same atmospheric turbulence that distorted the incoming beam. Accordingly, a phase correction calculated for an incoming beam will also apply to an outgoing beam if the outgoing beam is sent at approximately the same time that the incoming beam is received. The outgoing beam from source 40 is directed to aperture sharing element 41, which directs the outgoing beam to DM 21, through lenses 20 and 19, to SM 14. From SM 14, the outgoing beam is directed through lens 13 and out of telescope aperture 12. For purposes of explanation, the outgoing beam is shown in FIG. 1B as spatially offset from the incoming beam. In practice, however, this offset would not necessarily be present.

Figure 3:
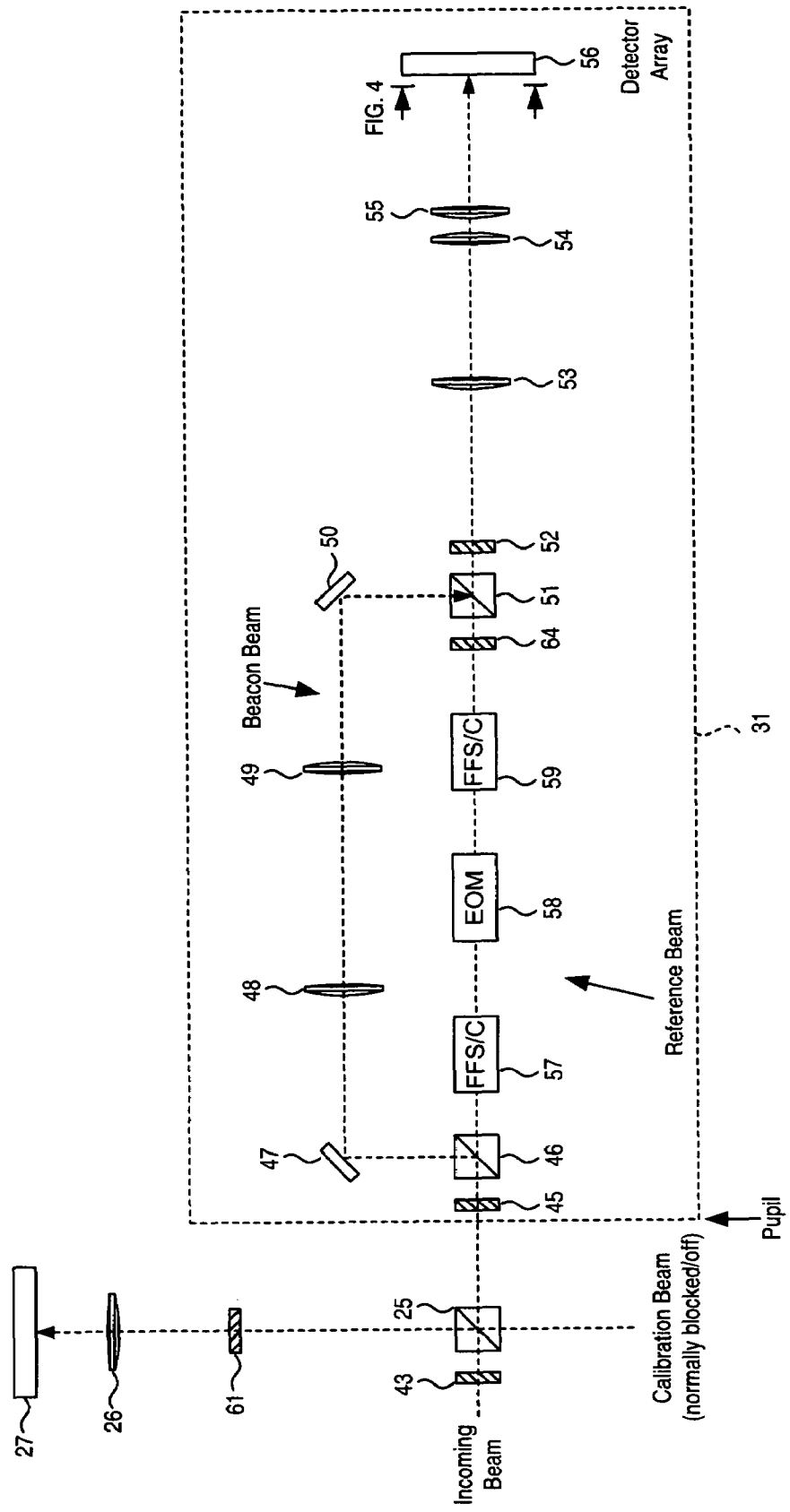
FIG. 3 is a block diagram of a temporal phase shifting self-referencing interferometer (SRI) wavefront sensor (WFS) according to at least some embodiments.

FIG. 3 is a block diagram of a temporal SRI employed for WFS 31 according to at least some embodiments. Polarizing beam splitter (PBS) 25 receives the incoming beam from half wave plate (HWP) 43. A portion of the beam from PBS 25 then enters WFS 31. The pupil plane of WFS 31, which corresponds to the plane of SM 14 and of DM 21, is optically conjugate to the output of both polarizing beam splitter (PBS) 46 and PBS 51. The input to WFS 31 is linearly polarized so that power to different components of WFS 31 can be controlled using half wave plates to rotate the polarization and polarizing beam splitters to split and rejoin the beam. At the input of WFS 31, a sample of the beam is split using PBS 46, with the power of the beam entering PBS 46 controlled with HWP 45; in this manner, HWP 45 and PBS 46 control the amount of light split between "beacon beam" and "reference beam" legs. The beacon beam is reflected by turning flat (TF) 47, through lenses 48 and 49, to TF 50. From TF 50 the beacon beam is reflected to PBS 51 and brought together with the reference beam. The reference beam is created by coupling the other beam exiting PBS 46 to a single mode fiber in a first fiber focusing system/collimator (FFS/C) 57. FFS/C 57 spatially filters the incoming beam to create a DC phase reference beam. From FFS/C 57 the reference beam passes through electro-optic modulator (EOM) 58. As described in more detail below, EOM 58 is used to sequentially shift the phase of the entire reference beam by a known amount. From EOM 58, the reference beam passes through a second FFS/C 59 and a HWP 64 to PBS 51. The beacon and reference beams, after being rejoined in PBS 51, pass through HWP 52 and lenses 53, 54 and 55 before striking detector array 56.

Figure 4:
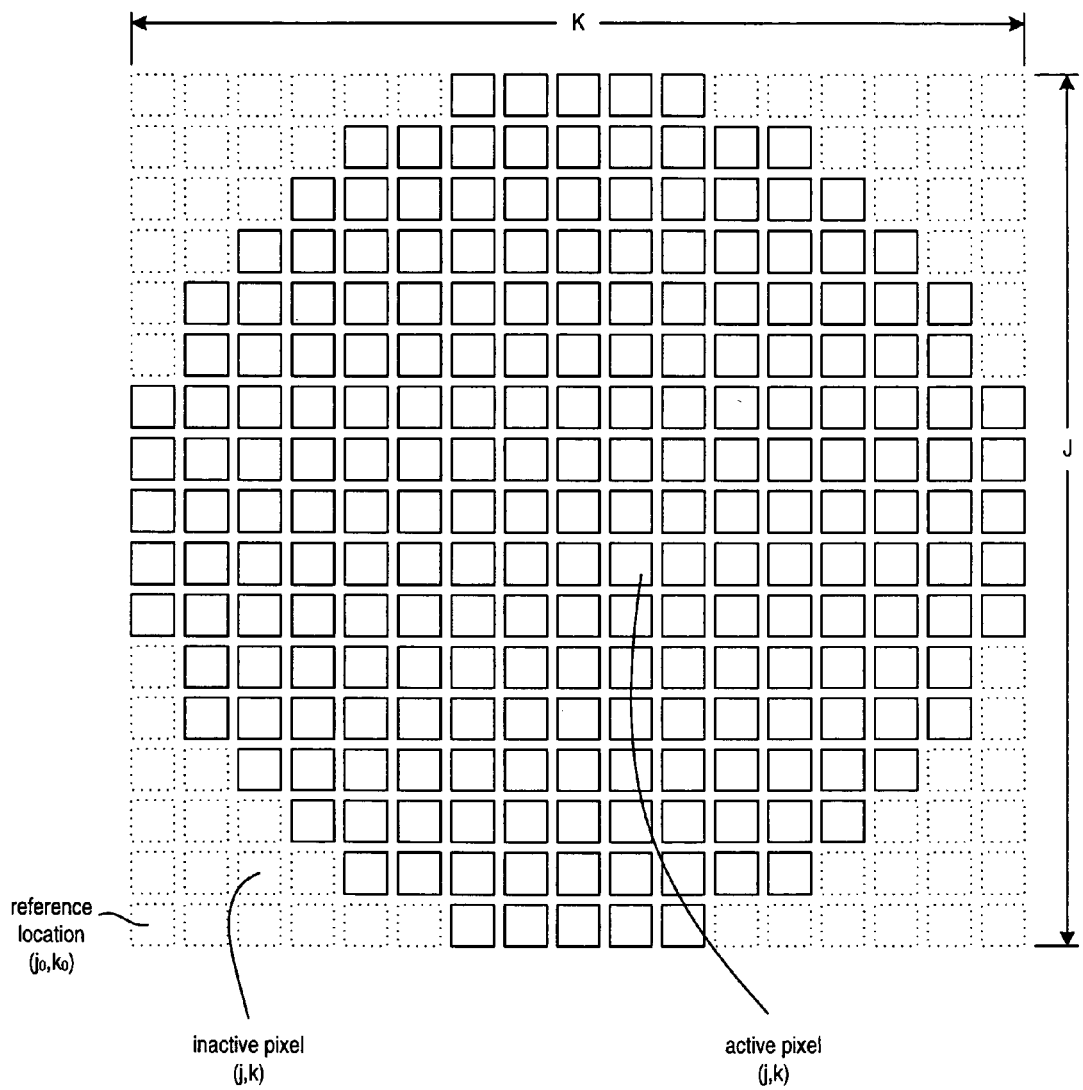
FIG. 4 is a view of an SRI WFS detector array from the position indicated in FIG. 3.

Detector array 56, similar to focal plane array 27, includes multiple light sensitive pixels outputting signals that vary in response to intensity of received light. FIG. 4 is a view of detector array 56 from the position shown in FIG. 3, and shows each pixel of array 56 as a square. Each of the pixels in detector array 56 corresponds to a separate output channel of WFS 31. Each pixel/output channel from detector array 56 further corresponds to a specific control channel (and corresponding micro-mirror) of DM 21. In other words, the beam subaperture occupied by a pixel of detector array 56 having a particular combination of (j,k) indices is the same subaperture occupied by the micro-mirror of DM 21 having the same (j,k) indices. In this manner, intensities measured by a pixel (j,k) of detector array 56 are used to calculate phase corrections applied by a corresponding pixel (j,k) in DM 21. Stated differently, a given set of indices (j,k) describes the same subaperture at detector array 56 and at DM 21. As with the micro-mirrors of DM 21 shown in FIG. 2, the pixels of detector array 56 are classified as active (shown in solid lines) or inactive (shown in dotted lines). Active pixels are those receiving a significant subaperture, while inactive pixels are those not receiving a significant subaperture. An arbitrarily chosen pixel $(j_0,k_0)$ is used as a reference point. The purpose of this reference point is described in more detail below.

When the beacon beam and reference beam are rejoined in PBS 51, the two beams interfere. This interference creates a fringe pattern on detector array 56; the intensity of light in various portions of this fringe pattern will vary based on the respective phases of the beacon and reference beams. The reference beam will be a single phase (albeit shifted in some cases by EOM 58), but the beacon beam will generally have a distribution of phases across its wavefront. During each frame for which an image is captured by focal plane array 27, EOM 58 is used to phase shift the entire reference beam relative to the beacon beam by 0, $\pi/2$, $\pi$, and $3\pi/2$. This results in four distinct fringe patterns, and thus four intensity values $I_0(j,k)$, $I_{\pi/2}(j,k)$, $I_\pi(j,k)$ and $I_{3\pi/2}(j,k)$ at each pixel (j,k). These intensity values are provided to FPGA 30 and used in a sliding window fashion to estimate the phase errors on the wavefront. FPGA 30 determines the phase error of the incoming beam at the subaperture associated with each detector array 56 pixel. FPGA 30 provides each phase error determination, in a manner also described below, for correction by the corresponding DM 21 micro-mirror.

Figure 5A:
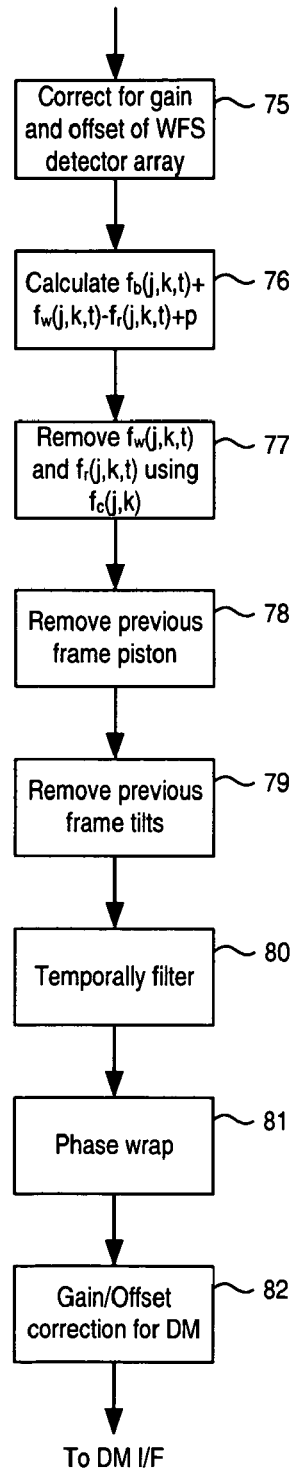
FIG. 5A is a flow chart for an algorithm, according to at least some embodiments, for calculating commands to a single channel of a phase correction device in the system of FIG. 1A or FIG. 1B based on data received from a single channel of a WFS.

FIG. 5A is a flow chart showing calculation of commands to a single channel of DM 21 based on data received from a single channel of WFS 31. The algorithm of FIG. 5A can be carried out in parallel within FPGA 30 for each channel of WFS 31 and its corresponding channel of DM 21. Beginning at the top of FIG. 5A, data from a single channel of WFS 31 (i.e., for a pixel (j,k) in detector array 56 of FIG. 4) for a frame at time t is input to block 75. That data is shown in FIG. 5A as $I_0(j,k,t)$, $I_{\pi/2}(j,k,t)$, $I_\pi(j,k,t)$ and $I_{3\pi/2}(j,k,t)$, where t is a time index for the current imaging frame. For each value of $\theta$ (i.e., 0, $\pi/2$, $\pi$, and $3\pi/2$) by which the reference beam is modulated in EOM 58, the intensity $I_\theta(j,k,t)$ at pixel (j,k) can be described by Equation 1.

$$I_\theta(j,k,t) = A_b^2(j,k,t) + A_r^2(j,k,t) - 2A_b A_r \cos[\phi_b(j,k,t) + \phi_w(j,k) - \phi_r(j,k) + p(t) + \theta] \quad \text{Equation 1}$$

where:
- $A_b$=beacon beam amplitude, in the subaperture associated with pixel (j,k), during frame t,
- $A_r$=reference beam amplitude, in the subaperture associated with pixel (j,k), during frame t,
- $\phi_b$=beacon beam phase, in the subaperture associated with pixel (j,k), during frame t,
- $\phi_w$=phase introduced, in the subaperture associated with pixel (j,k), by aberrations in the wavefront sensor; $\phi_w$ remains generally constant over multiple frames,
- $\phi_r$=reference beam phase (prior to entry into EOM 58) in the subaperture associated with pixel (j,k); $\phi_r$ remains generally constant over multiple frames, and
- p(t)=random differential average piston phase (i.e., spatial average over beam wavefront) between beacon and reference beams at frame t In block 75, each value $I_0(j,k,t)$, $I_{\pi/2}(j,k,t)$, $I_\pi(j,k,t)$ and $I_{3\pi/2}(j,k,t)$ is initially corrected for gain and offset according to Equations 2 through 5.

$$I_0(j,k,t)|_{gb} = \frac{I_0(j,k,t) - b_0(j,k)}{g_0(j,k)} \quad \text{Equation 2}$$

$$I_{\pi/2}(j,k,t)|_{gb} = \frac{I_{\pi/2}(j,k,t) - b_{\pi/2}(j,k)}{g_{\pi/2}(j,k)} \quad \text{Equation 3}$$

$$I_\pi(j,k,t)|_{gb} = \frac{I_\pi(j,k,t) - b_\pi(j,k)}{g_\pi(j,k)} \quad \text{Equation 4}$$

$$I_{3\pi/2}(j,k,t)|_{gb} = \frac{I_{3\pi/2}(j,k,t) - b_{3\pi/2}(j,k)}{g_{3\pi/2}(j,k)} \quad \text{Equation 5}$$

In Equations 2 through 5, the notation "$I_\theta(j,k,t)|_{gb}$" indicates the values of $I_\theta(j,k,t)$ after correction for gain and offset. The quantity $b_\theta(j,k)$ is the bias of detector array 56 at pixel (j,k), and where $\theta$=0, $\pi/2$, $\pi$, and $3\pi/2$. The quantity $g_\theta(j,k)$ is the gain of detector array 56 at pixel (j,k), with $\theta$=0, $\pi/2$, $\pi$, and $3\pi/2$. The gain and bias of detector array 56 can be determined in any of numerous manners known in the art.

The bias- and gain-corrected values $I_0(j,k,t)|_{gb}$, $I_{\pi/2}(j,k,t)|_{gb}$, $I_\pi(j,k,t)|_{gb}$ and $I_{3\pi/2}(j,k,t)|_{gb}$ are then used in block 76 to calculate, using Equations 6 through 8, the quantity $[\phi_b(j,k,t) + \phi_w(j,k) - \phi_r(j,k) + p(t)]$.

$$I_0(j,k,t)|_{gb} - I_\pi(j,k,t)|_{gb} = \\ 4A_b A_r \cos[\phi_b(j,k,t) + \phi_w(j,k) - \phi_r(j,k) + p(t)] \quad \text{Equation 6}$$

$$I_{\pi/2}(j,k,t)|_{gb} - I_{3\pi/2}(j,k,t)|_{gb} = \\ 4A_b A_r \sin[\phi_b(j,k,t) + \phi_w(j,k) - \phi_r(j,k) + p(t)] \quad \text{Equation 7}$$

$$\phi_b(j,k,t) + \phi_w(j,k) - \phi_r(j,k) + p(t) = \\ \tan^{-1} \frac{I_{\pi/2}(j,k,t)|_{gb} - I_{3\pi/2}(j,k,t)|_{gb}}{I_0(j,k,t)|_{gb} - I_\pi(j,k,t)|_{gb}} \quad \text{Equation 8}$$

A quadrant check in conjunction with Equation 8 is also employed. In particular, the signs of the numerator and denominator in the $\tan^{-1}$ argument are examined to determine whether $\pi/2$, $\pi$ or $-\pi/2$ must be added to the $\tan^{-1}$ result.

In at least some embodiments, the calculations of Equation 8 are performed within block 76 using a divide-free phase error computation technique. Such a technique offers a number of distinct advantages. For example, this technique allows definition of the desired phase precision. This technique also provides a natural "smashing" approach that assigns pixels with a small intensity (and thus poor signal to noise ratio) a zero phase. This technique can be implemented at very high speeds, as a table look-up is used instead of a divide. Although some storage capacity is necessary for the look-up table, the amount of required storage is relatively small unless very high phase precision is needed (which is usually not the case).

The divide-free technique begins with the results of Equations 6 and 7. For purposes of explanation, the quantity $I_0(j,k,t)|_{gb} - I_\pi(j,k,t)|_{gb}$ is denoted C(j,k,t) and the quantity $I_{\pi/2}(j,k,t)|_{gb} - I_{3\pi/2}(j,k,t)|_{gb}$ is denoted S(j,k,t). C(j,k,t) and S(j,k,t) are nominally N+1 bit numbers, where N is the maximum available number of bits of precision of detector array 56. The desired precision for phase error computation is then defined as M+1. The initial step of the divide-free computation is to retain only the M most significant bits of C(j,k,t) and S(j,k,t);

a minimum of L bits are discarded so that low signal levels report a phase value of zero. The same set of M bits is kept in both numbers.

For example, assume that N=12, C(j,k)=−000010101100=−172, and that S(j,k)=000000000010=2. C(j,k,t) has 8 significant bits and S(j,k,t) has 2 significant bits. The most significant bit (MSB) in each number is bit 8. If respective M and L values of 7 and 2 are chosen, bit 3 becomes the minimum significant bit in both C(j,k,t) and S(j,k,t), and bits 3 through 9 are retained. Thus, C(j,k,t) becomes −0101011, or −43. S(j,k,t) becomes 00000000, or 0. These values of C(j,k,t) and S(j,k,t) are then used as indices to a look-up table. Specifically, $[\phi_b(j,k,t)+\phi_w(j,k)-\phi_r(j,k)+p(t)]$ =a tan M[C(j,k,t),S(j,k,t)], where the matrix "a tan M[ ]" is a $(2^{M+1}+1)\times(2^{M+1}+1)$ table of the arc-tangent of integer values ranging from $-2^M$ to $2^M$ in both the sine and cosine terms, and with the arc-tangent of (0,0) defined as 0.

Using Equations 9 through 11, the a tan M matrix can be computed in advance and stored in a look-up table within (or accessible by) FPGA 30.

$$x = \text{ones}((2^{M+1})+1,1) * [-2^M:1:2^M] \qquad \text{Equation 9}$$

$$y = x^T \qquad \text{Equation 10}$$

$$\text{a tan } M[\ ] = \tan^{-1}(y/x) \qquad \text{Equation 11}$$

In Equation 9, the quantity "ones$((2^{M+1})+1,1)$" is a $((2^{M+1})+1)\times 1$ matrix of ones. The quantity "$[-2^M:1:2^M]$" in Equation 9 is a $1 \times (2*2^M-1)$ matrix of integers from $-2^M$ to $2^M$. In other words, x is a $((2^{M+1})+1)$ by $((2^{M+1})+1)$ matrix in which each row contains integers from $-2^M$ through $2^M$.

Continuing with the preceding example in which C(j,k,t)=−43 and S(j,k,t)=0, and using a look-up table generated with Equations 9 through 11, $[\phi_b(j,k,t)+\phi_w(j,k)-\phi_r(j,k)+p(t)]=\pi$. Note that the error introduced by reducing precision is small, as $\tan^{-1}[-2/172]=3.1300$.

As previously indicated, a look-up table generated with Equations 9 through 11 can be computed in advance and stored for access by FPGA 30 during phase error computation. In at least some embodiments, only data for the upper right quadrant of the table is stored (i.e., data for positive values of C(j,k,t) and S(j,k,t)). When calculating phase error, a quadrant check is then performed on the input values of C(j,k,t) and S(j,k,t)) and the result obtained from the look-up table is corrected as required. For example, the result from the look-up table is already correct if C(j,k,t) and S(j,k,t)) are both positive. If C(j,k,t) is negative and S(j,k,t)) is positive, π/2 is added to the look-up table output. If C(j,k,t) is positive and S(j,k,t)) is negative, π/2 is subtracted from the look-up table output. If C(j,k,t) and S(j,k,t)) are both negative, π is added to (or subtracted from) the look-up table output.

Figure 5B:
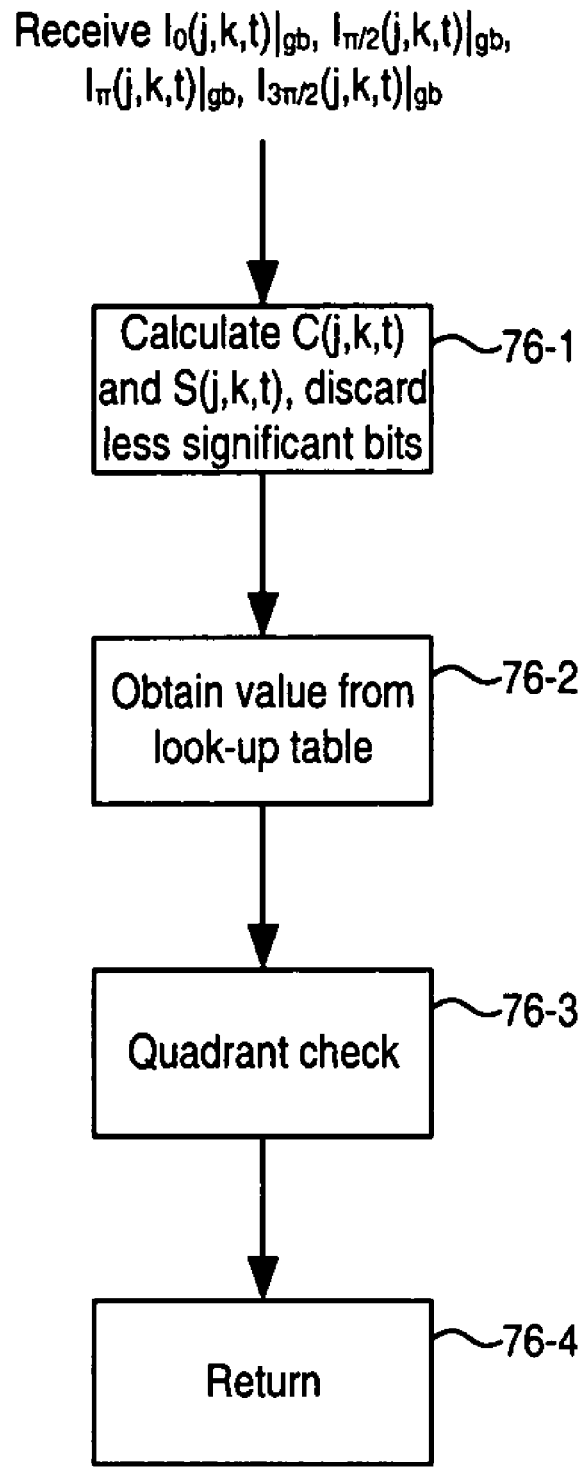
FIG. 5B is a flow chart for a divide-free technique employed in the algorithm of FIG. 5A.

FIG. 5B is a flow chart showing the divide-free technique used in at least some embodiments to obtain an approximation of the quantity $[\phi_b(j,k,t)+\phi_w(j,k)-\phi_r(j,k)+p(t)]$. Beginning in block 76-1, the quantities C(j,k,t) (i.e., $I_0(j,k,t)|_{gb}-I_\pi(j,k,t)|_{gb}$) and S(j,k,t) (i.e., $I_{\pi/2}(j,k,t)|_{gb}-I_{3\pi/2}(j,k,t)|_{gb}$) are calculated, and the appropriate bits of each discarded in accordance with the desired precision. In block 76-2, a value is obtained from a look-up table using the outputs of block 76-1. In block 76-3, a quadrant check is performed and any necessary adjustment made to the look-up table result. In block 76-4, the output of the divide-free technique (an approximation of the quantity $[\phi_b(j,k,t)+\phi_w(j,k)-\phi_r(j,k)+p(t)]$) is returned to the algorithm of FIG. 5A.

Returning to FIG. 5A, the algorithm then proceeds to block 77, where $[+\phi_w(j,k)-\phi_r(j,k)]$ is removed. As part of constructing system 10, a calibration phase $\phi_c(j,k)$ is computed for each (j,k) pixel of detector array 56. Further details of this computation are provided below. Because the calibration phase $\phi_c(j,k)$ is approximately equal to $[\phi_w(j,k)-\phi_r(j,k)]$, the reference phase and the phase introduced at pixel location (j,k) by the wavefront sensor are removed using Equation 12.

$$\phi_b(j,k,t)|_{-c} = \text{mod } [\phi_b(j,k,t)+\phi_w(j,k)-\phi_r(j,k)-\phi_c(j,k)+p(t)+\pi, 2\pi]-\pi \qquad \text{Equation 12}$$

The notation "$\phi_b(j,k)|_{-c}$" indicates the approximated value of $\phi_b(j,k,t)$ after removal of $\phi_c(j,k)$.

The algorithm then proceeds to block 78. In block 78, the piston term p(t) is removed by subtracting the piston from the previous (t−1) frame, as shown in Equation 13.

$$\phi_b(j,k,t)|_{-c-p} = \text{mod } [\phi_b(j,k,t)|_{-c}+p(t)-p(t-1)+\pi, 2\pi]-\pi \qquad \text{Equation 13}$$

The notation "$\phi_b(j,k)|_{-c-p}$" indicates the approximated value of $\phi_b(j,k,t)$ after removal of $\phi_c(j,k)$ and of the previous frame piston. Computation of piston is described in more detail below.

From block 78, the algorithm proceeds to block 79, where the tilts from the previous frame are subtracted from $\phi_b(j,k)|_{-c-p}$. As is also described in more detail below, phase error computed from WFS 31 data can also be used to determine the amount by which SM 14 is rotated about its x and y axes to compensate for tip and tilt error. Tip and tilt observed on the wavefront sensor in a given frame are then subtracted from the phase error computation of the following frame. In this manner, the control loops for higher order and tip/tilt are de-coupled, minimizing "fighting" between the two control loops. In addition, removal of tilt from the DM commands minimizes attempts by the DM to compensate for tip and tilt, minimizing artificial branch cuts on the DM induced by the phase wrapping algorithm. Tilts for frame (t−1) are removed in block 79 according to Equation 14.

$$\phi_b(j,k,t)|_{-c-p-t} = \text{mod } [\phi_b(j,k,t)|_{-c-p}-x(t-1)*W_x(j,k)-y(t-1)*W_y(j,k)+\pi, 2\pi]-\pi \qquad \text{Equation 14}$$

where:
x(t−1)=x axis tilt computed from WFS data for image frame at time t−1,
y(t−1)=y axis tilt computed from WFS data for image frame at time t−1,
$W_x(j,k)$ is the (j,k) element of the two-dimensional matrix $W_x$, a normalized weighting function that represents a plane wave along row j, as set forth in Equation 14.1 below, and
$W_y(j,k)$ is the (j,k) element of the two-dimensional matrix $W_y$, a normalized weighting function that represents a plane wave along column k, as set forth in Equation 14.2 below.

$$W_x(j,k) = \frac{(j-j_0)}{\sum_{k'=1}^{K}\sum_{j'=1}^{J}((j'-j_0)^2 * M(j',k'))} \qquad \text{Equation 14.1}$$

where:
$j_0$=the row index for the arbitrarily selected reference location in detector array 56 and DM 21 (see FIGS. 2 and 4),
j=the row index for the location in the beam wavefront corresponding to pixel (j,k) of detector array 56 (and thus, of the (j,k) micro-mirror of DM 21),
M(j',k')=a mask of ones and zeros indicating which (j',k') combinations correspond to active and inactive pixels in detector array 56 and to active and inactive micro-mirrors in DM 21, and J,K=dimensions of detector array 56 and DM 21 (see FIGS. 2 and 4).

$$W_y(j,k) = \frac{(k-k_0)}{\sum_{k'=1}^{K}\sum_{j'=1}^{J}((k'-k_0)^2 * M(j',k'))} \quad \text{Equation 14.2}$$

where:

$k_0$=the column index for the arbitrarily selected reference location in detector array 56 and DM 21 (see FIGS. 2 and 4), k=the column index for the location in the beam wavefront corresponding to pixel (j,k) of detector array 56 (and thus, of the ((j,k) micro-mirror of DM 21), and M(j',k'), J, and K are the same as in Equation 14.1

The output of block 79 ($\phi_b(j,k,t)|_{-c-p-t}$) represents a modulo-$2\pi$ approximation of the phase error in the subaperture corresponding to the (j,k) pixel of detector array 56 and to the (j,k) micro-mirror of DM 21. This phase error is used in block 80 to generate an initial command d(j,k,t) for DM I/F 22 according to Equation 15.

$$d(j,k,t) = a*\phi_b(j,k,t)|_{-c-p-t} + b*d(j,k,t-1) \quad \text{Equation 15}$$

The quantity d(j,k,t) is a phase (in radians). The quantity d(j,k,t−1) is the initial command (prior to temporal filtering, as described below) from the previous frame.

Using Equation 15, the phase errors to be corrected by DM 21 are temporally filtered so as to provide system stability and avoid noise amplification. The quantities a and b in Equation 15 are filter coefficients. In some embodiments, $a = K_{DC}(1-b)$; b ranges from zero to one, and is typically near one (e.g., between about 0.90 and about 0.95). The quantity $K_{DC}$ is the desired loop DC gain, assuming loop gain after other calibrations is unity. Adjusting the coefficient b controls the stability and closed loop bandwidth of system 10. The low pass filter form for the temporal filter provided by Equation 15 is only one type of filter that may be used. Any stable control filter is suitable. Design of a temporal filter for a specific application is within the routine ability of a person skilled in the art once such person is provided with the information contained herein. If centroid tracking is used for SM 14, lower filter coefficients should be used.

Figure 6:
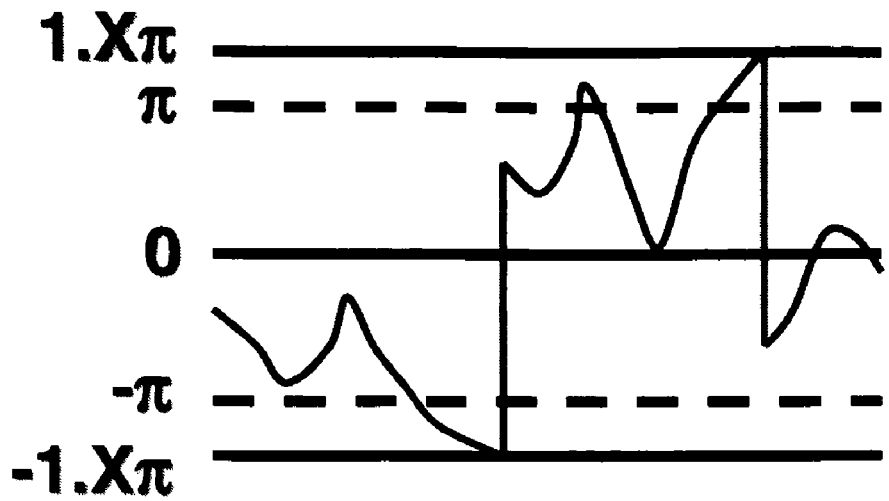
FIG. 6 is a graph showing an example of a time series of the phase wrapping algorithm.

The output of block 80 is then phase wrapped with a hysteresis in block 81 so as to avoid non-linear limit cycling. In at least some embodiments, a phase wrapping algorithm described by the following pseudo code is employed.

if $d(j,k,t) > 1 \cdot X^*\pi$ $d(j,k,t) = d(j,k,t) - 2\pi$ else if $d(j,k,t) < -1 \cdot X^*\pi$ $d(j,k,t) = d(j,k,t) + 2\pi$ end;

The parameter X is selected based on how well system 10 is calibrated. For a well calibrated system, X is relatively small, such that only slightly more than a wave of correction is used. For a poorly calibrated system, X is large so as to allow for calibration errors in the phase wrapping step. FIG. 6 is a graph showing an example of how phase wrapping according to the above pseudo code might be applied.

From block 81, the algorithm of FIG. 5A proceeds to block 82. In block 82, additional gain and offset calibration are applied as set forth in Equation 16.

$$d(j,k,t)|_{GB} = G_{DM}(j,k) * [d(j,k,t) - B_{DM}(j,k)] \quad \text{Equation 16}$$

The quantities $G_{DM}(j,k)$ and $B_{DM}(j,k)$ are, respectively, the gain and device actuator bias of DM 21 for position (j,k). The gain and device actuator bias of DM 21 can be determined in various ways known to persons skilled in the art. From block 82, values of $d(j,k,t)|_{GB}$ for each WFS channel are forwarded to driver electronics 16, which then formats, amplifies and forwards same to DM I/F 22.

Figure 7:
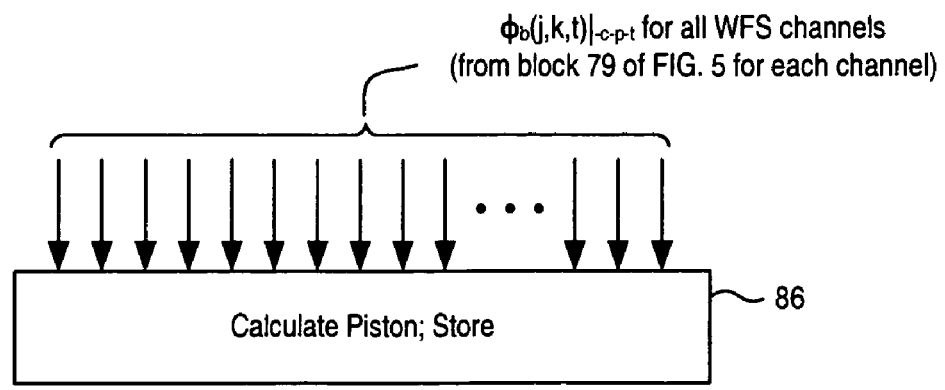
FIG. 7 is a flow chart for an algorithm, according to at least some embodiments, for calculating piston.

FIG. 7 is a block diagram showing an algorithm, according to at least some embodiments, by which FPGA 30 calculates piston based on data from WFS 31. As seen in FIG. 7, the piston calculation algorithm receives, from block 79 of the FIG. 5A algorithm performed as to each channel of WFS 31, a channel-specific value of $\phi_b(j,k,t)|_{-c-p-t}$. In block 86, the piston for the t−1 frame is calculated according to Equation 17.

$$p(t) = \tan^{-1}\left[\tan^{-1}\frac{\sum_{j'=1}^{J}\sum_{k'=1}^{K}M(j',k')*\sin[\phi_b(j',k',t)|_{-c-p-t}]}{\sum_{j'=1}^{J}\sum_{k'=1}^{K}M(j',k')*\cos[\phi_b(j',k',t)|_{-c-p-t}]}\right] \quad \text{Equation 17}$$

The quantity M(j',k') in Equation 16 has the same meaning as in Equations 14.1 and 14.2. The value for p(t) calculated in block 86 of FIG. 7 is then used, during processing of the WFS 31 data for time t+1, in the algorithm of FIG. 5A. In at least some embodiments, the calculations of FIG. 7 for frame t are performed during the integration period (i.e., the time during which the pixels of arrays 27 and 56 are collecting light and generating signals based on that received light) for the t+1 imaging frame. In processing the first frame of data, a piston value of zero can arbitrarily be used. Typically, the system is running continuously in an open loop mode before actually closing the loop, in which case a valid piston value from the previous frame always exists.

Figure 8:
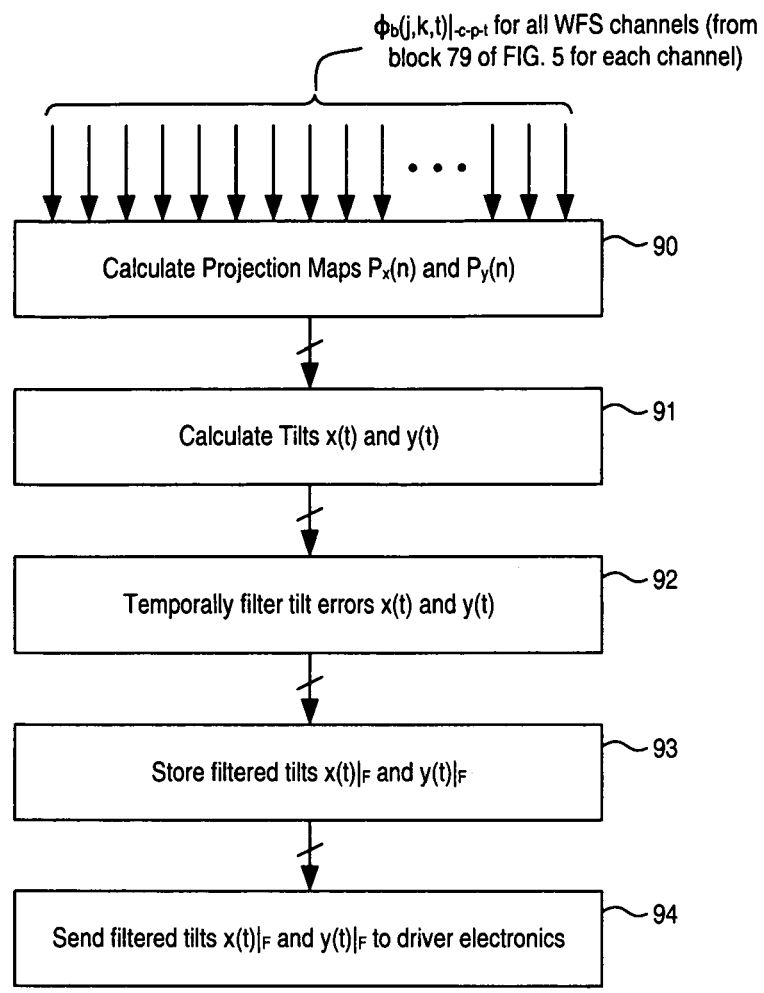
FIG. 8 is a flow chart for an algorithm, according to at least some embodiments, for calculating steering mirror tilts using data from an SRI wavefront sensor.
Figure 9A:
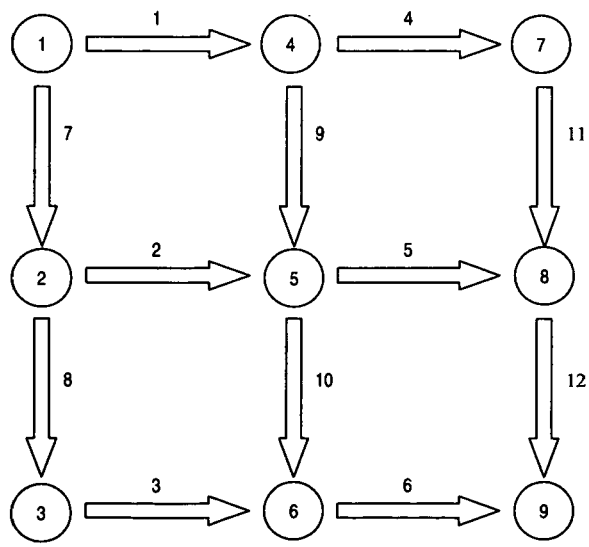
FIG. 9A a block diagram illustrating shearing geometry for a 3×3 array.

FIG. 8 is a block diagram showing an algorithm, according to at least some embodiments, by which FPGA 30 calculates x and y tilts based on data from WFS 31. The tilt calculation algorithm in FIG. 8 receives, from block 79 of the FIG. 5A algorithm performed for each channel of WFS 31, a channel-specific value of $\phi_b(j,k,t)|_{-c-p-t}$. In at least some embodiments, the algorithm of FIG. 8 calculates the Zernike tilts using a least squares reconstructor. This tilt calculation technique requires definition of a shearing geometry influence function matrix (denoted as G). The matrix G is a sparse matrix defining the values of phase differences between nearest neighbor micro-mirrors in DM 21. A "shearing geometry" is used to define the spatial locations of the outputs from matrix G. An example of a shearing geometry for a 3×3 array of DM micro-mirrors is shown in FIG. 9A. The numbers within the circles of FIG. 9A are indices to one of the micro-mirrors, while the numbers next to the arrows are indices to directions from one specific micro-mirror to another specific micro-mirror. FIG. 9B is the shearing geometry influence function matrix G for the 3×3 array of FIG. 9A. The extension of the example in FIGS. 9A and 9B to an arbitrarily-sized matrix will be readily apparent to persons skilled in the art, once such persons are provided with the information herein. Included in an Appendix at the conclusion of this Detailed Description is a listing (in the MATLAB programming language) for a computer program which generates a matrix G of a desired size in response to input of a square mask defining values of active phase values (corresponding nominally to active micro-mirrors of DM 21). The square mask here is the same as that for the matrix M(j,k) described previously.

In block 90 of FIG. 8, projection maps $P_x(n)$ and $P_y(n)$ for the x and y tilts, respectively, are calculated according to Equations 18 and 19.

$$P_x(n) = \sum_{j'=1}^{J}\sum_{k'=1}^{K} M(j',k') * W_x(j',k') * E_0[j' + (k'-1)*J, n] \qquad \text{Equation 18}$$

$$P_y(n) = \qquad \text{Equation 19}$$
$$\sum_{j'=1}^{J}\sum_{k'=1}^{K} M(j',k') * W_y(j',k') * E_0[j' + (k'-1)*J, n]$$

The matrix $E_0$ in Equations 18 and 19 is the pseudo-inverse of G, and is defined as $(G^T G)^{-1} G^T$. $E_0$ can be calculated using the MATLAB programming language with the "pinv" command (e.g., "E_0=pinv(G)"). The quantity n in Equations 18 and 19 is an index to a shearing geometry phase difference. Equations 18 and 19 could alternatively be represented, using matrix-vector notation, as $P_x^T = \hat{W}_x^T E_0$ and $P_y^T = \hat{W}_y^T E_0$, where $\hat{W}_x^T$ is the transpose of the column major vector re-ordering of the two-dimensional map $W_x(j',k')$, and where $\hat{W}_y^T$ is the transpose of the column major vector re-ordering of the two-dimensional map $W_y(j',k')$.

From block 90, the algorithm of FIG. 8 proceeds to block 91 and calculates the x and y tilts at the time t frame according to Equations 20 through 22.

$$\hat{\Delta}(t) = \mathrm{mod}\left[G * \hat{\phi}(t) + \pi, 2\pi\right] - \pi \qquad \text{Equation 20}$$

$$x(t) = \sum_{n=1}^{N} P_x(n) * \hat{\Delta}(n,t) \qquad \text{Equation 21}$$

$$y(t) = \sum_{n=1}^{N} P_y(n) * \hat{\Delta}(n,t) \qquad \text{Equation 22}$$

The vector $\hat{\phi}(t)$ in Equation 20 is the column major vector representation of $\phi(t)$, which is in turn the two dimensional map of all values input to block 90 for time t. The quantity $\hat{\Delta}(n,t)$ in Equations 21 and 22 is the value of the $n^{th}$ member of $\hat{\Delta}(t)$, where N is the total number of members in $\hat{\Delta}(t)$.

From block 91 the tilt calculation algorithm proceeds to block 92, where the errors in tilts x(t) and y(t) are temporally filtered for application to SM 14 if the wavefront sensor is used for fine tracking.

The algorithm of FIG. 8 then proceeds to block 93, where filtered tilts $x(t)|_F$ and $x(t)|_F$ are stored for use in processing data from WFS 31 (using the algorithm of FIG. 5A) during the next (i.e., t+1) imaging frame. In processing the first frame of data, a tip and tilt value of zero can arbitrarily be used. Typically, the system is running continuously in an open loop mode before actually closing the loop, in which case a valid tip and tilt value from the previous frame always exists. In block 94, the filtered tilts $x(t)|_F$ and $x(t)|_F$ are provided to driver electronics 16. Although not shown in FIG. 8, driver electronics 16 formats and amplifies the filtered tilts and forwards them SM I/F 15 if the wavefront sensor is used for fine tracking.

Figure 10:
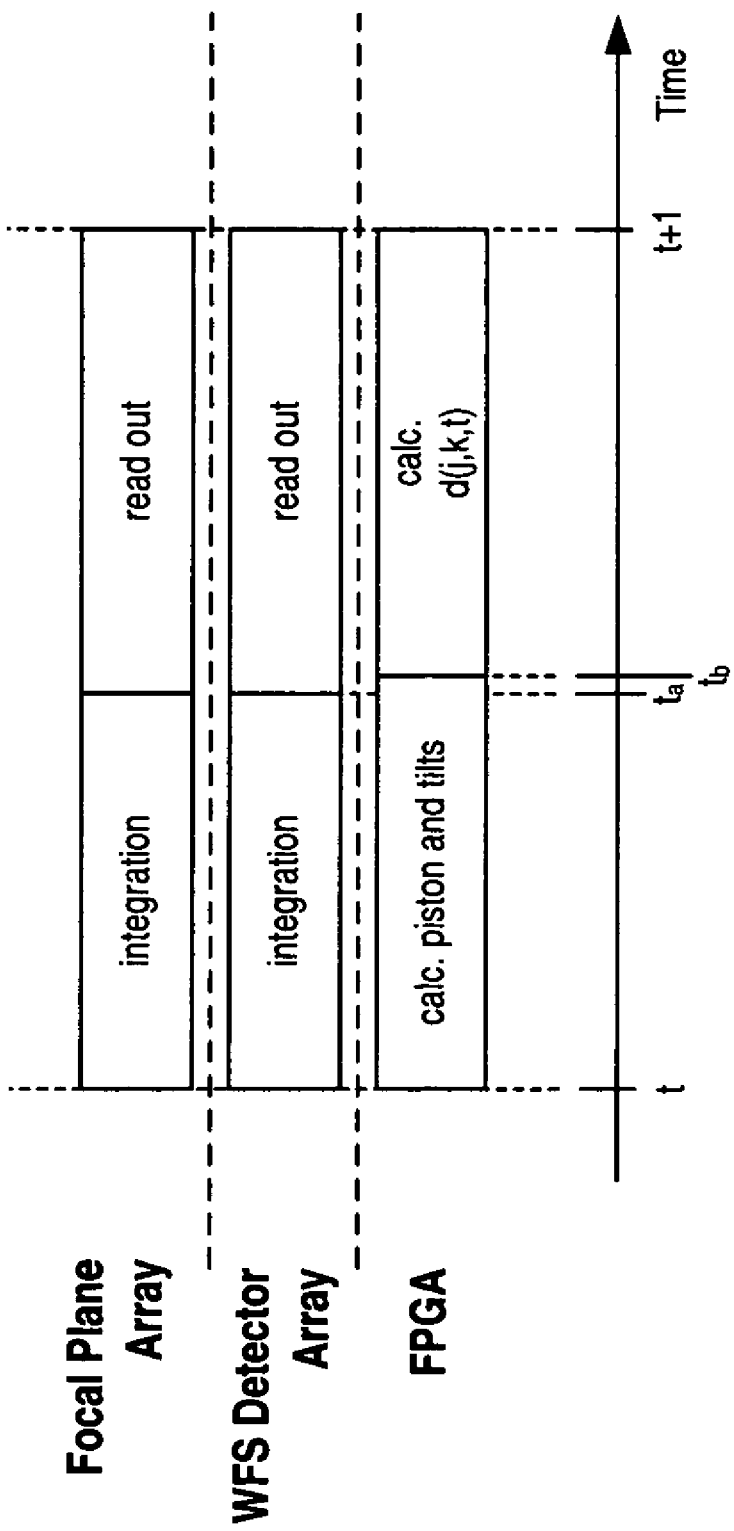
FIG. 10 is a timing diagram for the operation of a single WFS/phase correction device channel in the systems of FIGS. 1A and 1B.

FIG. 10 is a generalized timing diagram for the operation of DPCAO system 10 during an imaging frame commencing at an arbitrary time t and ending at time t+1. The times $t_a$ and $t_b$ represent times within that frame. At time t, an integration period for a new imaging frame begins. Light striking focal plane array 27 and detector array 56 causes individual pixels to generate electrical signals based upon the intensity of received light. Integration ends at time $t_a$. Also beginning at time t, FPGA 30 calculates piston and tilts based on $\phi_c(j,k,t-1)|_{-c-p-t}$ for each WFS/DM channel. The piston and tilt calculation ends at time $t_b$, and the newly-calculated piston and tilts are sent to driver electronics 16 (if tilt commands to SM 14 are based upon WFS data instead of focal plane array data). From time $t_a$ through time t+1, data ($I_0(j,k,t)$, $I_{\pi/2}(j,k,t)$, $I_\pi(j,k,t)$ and $I_{3\pi/2}(j,k,t)$) is read from each channel of array 56. As that data is read, and using the piston and tilts calculated for the t−1 frame (available at time $t_b$), $d(j,k,t)|_{GB}$ is calculated for each WFS/DM channel.

DPCAO system 10 (FIG. 1A), operating with the algorithm of FIG. 5A, provides a computationally efficient control approach for adaptive optical systems. By using modulo-2π computations, less dynamic range is needed for individual elements of a phase correction device. In some cases, however, the algorithm of FIG. 5A is less than optimal. When using a continuous face sheet deformable mirror as the phase correction device, for example, the algorithm of FIG. 5A can lead to increased wavefront fitting error. This increased error results from artificially induced 2π jumps applied to the phase correction device. Accordingly, an algorithm that partially unwraps the phase provides improved wavefront fitting error. In at least some embodiments, a modal DPCAO system implements an efficient partial unwrapping approach. Modal DPCAO essentially breaks control of the DM (or other phase correction device) into a direct phase control loop and a modal control loop. The modal loop includes a low order least squares unwrapping of the phase. In this context, "low order" means that only a small number of the modes of the least squares reconstruction of the phase are utilized. The modal loop error signal is subtracted from a DPCAO loop error signal, but the modal loop command signal is added to the DPCAO loop command signal to form the command applied to the phase correction device. The modal loop operates with additional data latency (1 frame), but this does not degrade performance for turbulence compensation applications because the servo bandwidth requirements for low spatial frequencies is lower than that for the high spatial frequencies. The number of modes of the reconstructed phase is primarily limited by the number of modes that can be efficiently computed in a particular hardware implementation. Typical commercially-available high performance FPGAs can support an entire modal DPCAO algorithm with about 50 modes for an 800 control channel system and provide satisfactory computational speed.

Figure 11A:
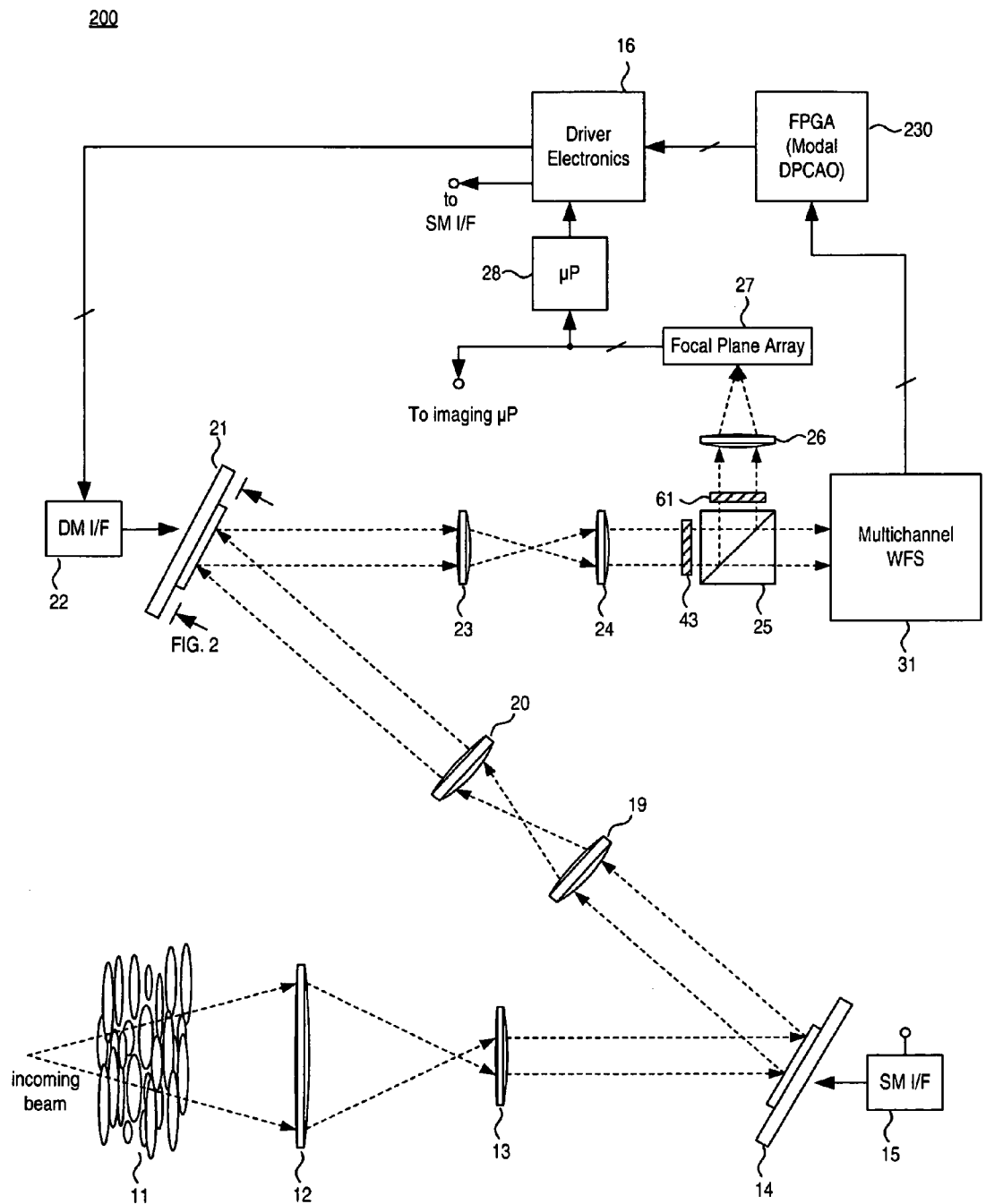
FIG. 11A is a block diagram of a modal direct phase control adaptive optical system according to at least some embodiments.
Figure 11B:
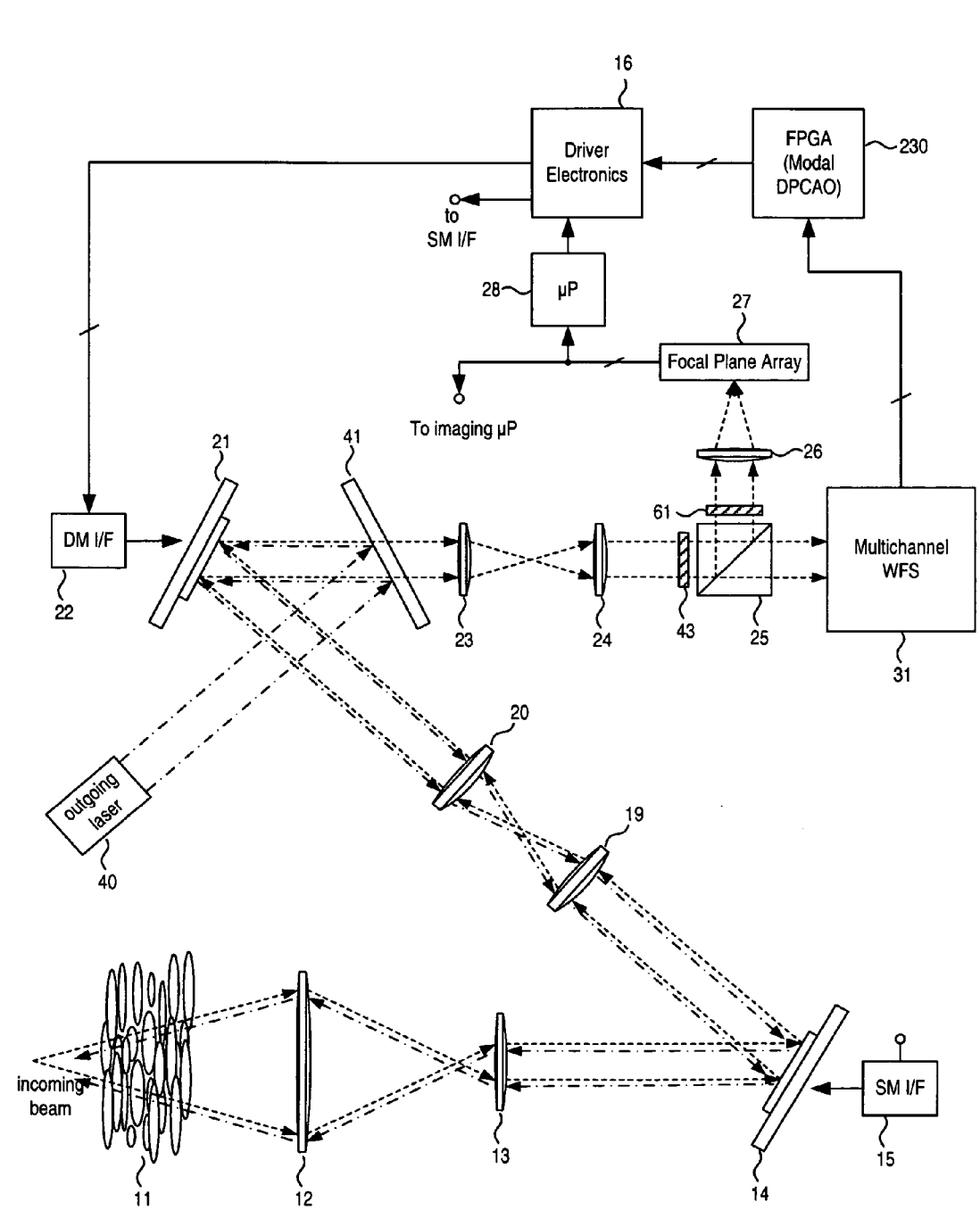
FIG. 11B is a block diagram of a modal direct phase control adaptive optical system similar to that of FIG. 11A, but which also provides turbulence precompensation in an outgoing laser beam.

FIG. 11A is a block diagram of a modal DPCAO system 200 according to at least some additional embodiments. Components of system 200 which function in the same manner as components of system 10 (FIG. 1A) have similar reference numbers. Unlike system 10, however, modal DPCAO system 200 provides a partial unwrapping of phase, and performs additional data processing upon data output from WFS 31. FPGA 230 of system 200 includes additional programming to perform this processing. FIG. 11B is a block diagram of a modal DPCAO system 200' which also precompensates, similar to system 10' of FIG. 1B, for atmospheric turbulence in an outgoing laser beam. Components in FIG. 11B that are similar to (and function in the same manner as) components in FIGS. 1A, 1B and 11A have the same reference numbers.

Figure 12:
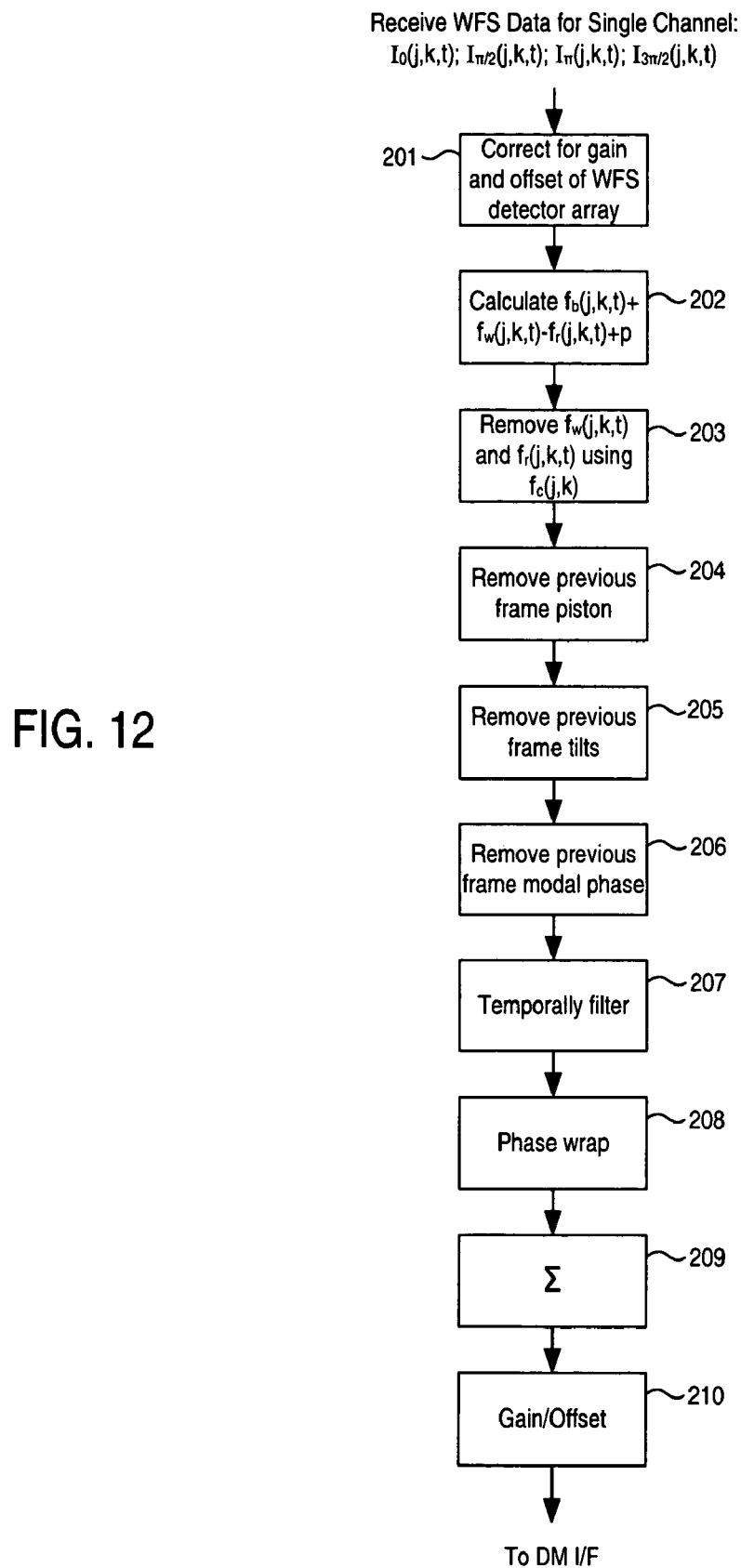
FIG. 12 is a flow chart for an algorithm, according to at least some embodiments, for calculating commands to a single channel of a phase correction device in the system of FIG. 11A or FIG. 11B based on data received from a single channel of a WFS.

FIG. 12 is a flow chart showing calculation of commands to a single channel of DM 21, based on data received from a single channel of WFS 31, in the modal DPCAO system of FIG. 11A or FIG. 11B. The algorithm of FIG. 12 can be carried out in parallel within FPGA 230 for each channel of WFS 31 and its corresponding channel of DM 21. Many of the computations within the algorithm of FIG. 12 are similar to those in the algorithm of FIG. 5A. For simplicity, previous discussions of such similar steps will not be repeated in detail.

Beginning at the top of FIG. 12, data from a single channel of WFS 31 (i.e., $I_0(j,k,t)$, $I_{\pi/2}(j,k,t)$, $I_\pi(j,k,t)$ and $I_{3\pi/2}(j,k,t)$) for a frame at time t is input to block 201. In block 201, each value $I_0(j,k,t)$, $I_{\pi/2}(j,k,t)$, $I_\pi(j,k,t)$ and $I_{3\pi/2}(j,k,t)$ is initially corrected for gain and offset as in block 75 of the algorithm of FIG. 5A. The bias- and gain-corrected values $I_0(j,k,t)|_{gb}$, $I_{\pi/2}(j,k,t)|_{gb}$, $I_\pi(j,k,t)|_{gb}$ and $I_{3\pi/2}(j,k,t)|_{gb}$ are then used in block 202 to calculate, in a manner similar to that described for block 76 of FIG. 5A, the quantity $[\phi_b(j,k,t)+\phi_w(j,k)-\phi_r(j,k)+p(t)]$. The algorithm then proceeds to block 203, where $[\phi_w(j,k)\phi_r(j,k)]$ is removed, in a manner similar to that described for block 77 of FIG. 5A, to yield $\phi_b(j,k)|_{-c}$. In block 204, the piston from the previous (t−1) frame is removed to yield $\phi_b(j,k)|_{-c-p}$ (as in block 78 of FIG. 5A). The previous frame tilts are subtracted in block 205 to yield $\phi_b(j,k)|_{-c-p-t}$ (as in block 79 of FIG. 5A). The output from block 205 for each channel of WFS 31 is used in algorithms for calculation of piston and tilts. The piston and tilt calculation algorithms described in conjunction with FIGS. 6 through 9B are also used in the piston and tilt calculations for the systems of FIGS. 11A and 11B.

From block 205, the algorithm proceeds to block 206. In block 206, the modal phase error $\phi_M(j,k,t-1)$ corresponding to the t−1 imaging frame is removed according to Equation 23.

$$\phi_b(j,k,t-1)|_{-c-p-t-M}=\mathrm{mod}\,[\phi_b(j,k,t-1)|_{-c-p-t}-\phi_M(j,k,t-1)+\pi, 2\pi]-\pi \qquad \text{Equation 23}$$

Computation of the modal phase error $\phi_M(j,k,t)$ is described below; $\phi_M(j,k,t-1)$ is simply the value computed for the (j,k) location for the previous imaging frame. From block 206, temporal filtering is applied in block 207 according to Equation 24.

$$d(j,k,t)=a*\phi_b(j,k,t)|_{-c-p-t-M}+b*d(j,k,t-1) \qquad \text{Equation 24}$$

The quantities a and b in Equation 24 are filter coefficients as previously described in conjunction with block 80 of FIG. 5A and Equation 15. The output of block 207 is then phase wrapped in block 208 in a manner similar to that described in conjunction with block 81 of FIG. 5A. The phase wrapped output from block 208 is then provided to block 209, which is discussed below. The low pass filter form for the temporal filter provided by Equation 24 is only one type of filter that may be used. Any stable control filter is suitable. Design of a temporal filter for a specific application is within the routine ability of a person skilled in the art once such person is provided with the information contained herein. If centroid tracking is used for SM 14, lower filter coefficients should be used.

Figure 13:
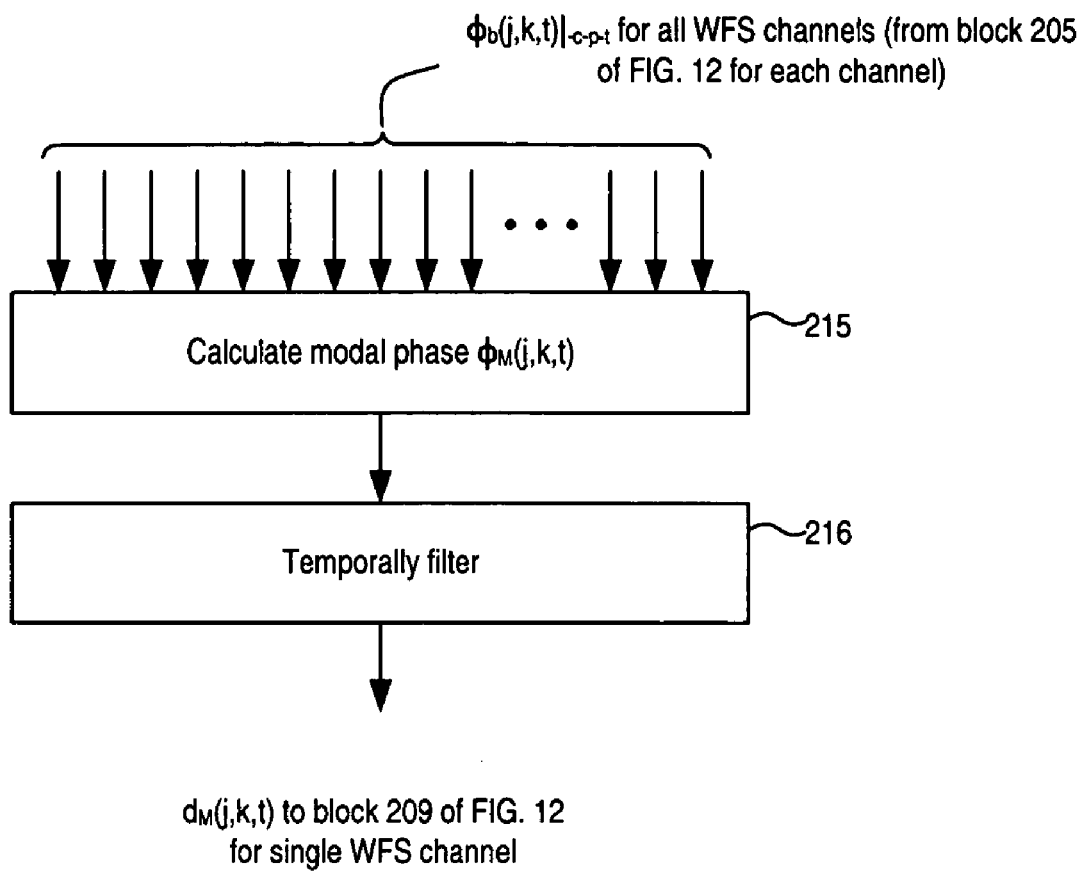
FIG. 13 is flow chart for a modal control loop according to at least some embodiments.

Blocks 201-208 form the direct phase control loop of the FIG. 12 algorithm. The modal control loop, which can be carried out in parallel by FPGA 230 for each channel of WFS 31, is shown in FIG. 13. Block 215 of FIG. 13 receives a value of $\phi_b(j,k)|_{-c-p-t}$ for each channel of WFS 31. In other words, the output of block 205 in the algorithm of FIG. 12, performed for each WFS channel, is input to block 215 of FIG. 13. In block 215, the modal phase error $\phi_M(j,k,t)$ is calculated for the subaperture corresponding to the (j,k) pixel of detector array 56 for the frame at time t. Modal phase error $\phi_M(j,k,t)$ is calculated using the least squares reconstructor matrix $E_{TR}$, which is defined as set forth in Equation 25.

$$E_{TR}=E_0\left[I-\frac{\hat{W}_x\hat{W}_x^T}{\hat{W}_x^T\hat{W}_x}-\frac{\hat{W}_y\hat{W}_y^T}{\hat{W}_y^T\hat{W}_y}\right] \qquad \text{Equation 25}$$

where:
$E_0$ is as defined in connection with Equations 17 and 18 (i.e., the pseudo-inverse of the matrix G, or $(G^TG)^{-1}G^T$),
I=the identity matrix,
$\hat{W}_x$ is the column major reordering of the previously defined two-dimensional map $W_x$ discussed in connection with Equation 14.1,
$\hat{W}_x^T$=is the transpose of $\hat{W}_x$,
$\hat{W}_y$ is the column major reordering of the previously defined two-dimensional map $W_y$ discussed in connection with Equation 14.2,
$\hat{W}_y^T$=is the transpose of $\hat{W}_y$.

The M modes to be considered in the modal control loop are obtained from Equations 26 and 27.

$$\hat{u}_m=U(:,m) \qquad \text{Equation 26}$$

where:
U=a matrix obtained from the singular value decomposition of $E_{TR}$, i.e., $E_{TR}=U\Sigma V^T$, and
"U(:,m)" refers to the $m^{th}$ column of the matrix U.

$$\hat{v}_m=V(:,m) \qquad \text{Equation 27}$$

where
V is the transpose of the matrix $V^T$ obtained from $E_{TR}=U\Sigma V^T$, and "V(:,m)" refers to the $m^{th}$ column of the matrix V.

After reordering the vector $\hat{u}_m$ as the J×K matrix $u_m$ using column major ordering, modal phase error $\phi_M(t)$ is calculated using Equation 28.

$$\phi_M(t)=\sum_{m=1}^{M}u_m(j,k)\sum_{n=1}^{N}\hat{v}_m(n)\Delta(n,t) \qquad \text{Equation 28}$$

where:
$\phi_M(t)$=a matrix of the modal phase error values at each (j,k) location at time t,
M=the number of modes to be considered,
$\Delta(n,t)$=the value of the $n^{th}$ member of $\hat{\Delta}(t)$ as defined in Equation 20, and
N=the total number of members in $\hat{\Delta}(t)$.

The modal phase error $\phi_M(j,k,t)$ output from block 215 is then temporally filtered in block 216 to obtain the modal phase commands. Specifically, the modal phase command for the (j,k) micro-mirror of DM 21, or $d_M(j,k,t)$, is as set forth in Equation 29.

$$d_M(j,k,t)=a_M\phi_M(j,k,t)+b_Md_M(j,k,t-1) \qquad \text{Equation 29}$$

The quantity $d_M(j,k,t)$ is a phase correction in radians. The quantities $a_M$ and $b_M$ in Equation 29 are filter coefficients obtained in a manner similar to that previously described in conjunction with Equation 15. In some embodiments, $a_M = K_{DC}(1-b_M)$; $b_M$ ranges from zero to one, and is typically near one. The quantity $K_{DC}$ is the desired loop DC gain, assuming loop gain after other calibrations is unity. Adjusting the coefficient $b_M$ controls the stability and closed loop bandwidth of system 200. The low pass filter form for the temporal filter provided by Equation 29 is only one type of filter that may be used. Any stable control filter is suitable. Design of a temporal filter for a specific application is within the routine ability of a person skilled in the art once such person is provided with the information contained herein. If centroid tracking is used for SM 14, lower filter coefficients should be used.

Returning to FIG. 12, the direct phase and modal control loops are rejoined in block 209. Specifically, the temporally filtered modal phase command from block 216 of FIG. 13 is used in block 209 of FIG. 12. In block 209, a preliminary control command $d_c(j,k,t)$ for the (j,k) micro-mirror region of DM 21 is obtained as set forth in Equation 30.

$$d_c(j,k,t) = d(j,k,t) + d_M(j,k,t) \quad \text{Equation 30}$$

The term $d(j,k,t)$ in Equation 30 is the temporally-filtered and phase-wrapped command output from block 208.

A gain and offset calibration is then applied to $d_c(j,k,t)$ in block 210, as set forth in Equation 31.

$$d_c(j,k,t)|_{GB} = G_{DM}(j,k)[d_c(j,k,t) - B_{DM}(j,k)] \quad \text{Equation 31}$$

The quantities $G_{DM}(j,k)$ and $B_{DM}(j,k)$ are, respectively, the gain and device actuator bias of DM 21 for position (j,k). The gain and device actuator bias of DM 21 can be determined in various ways known to persons skilled in the art. From block 210, values of $d_C(j,k,t)|_{GB}$ for each WFS channel are forwarded to driver electronics 16.

Figure 14:
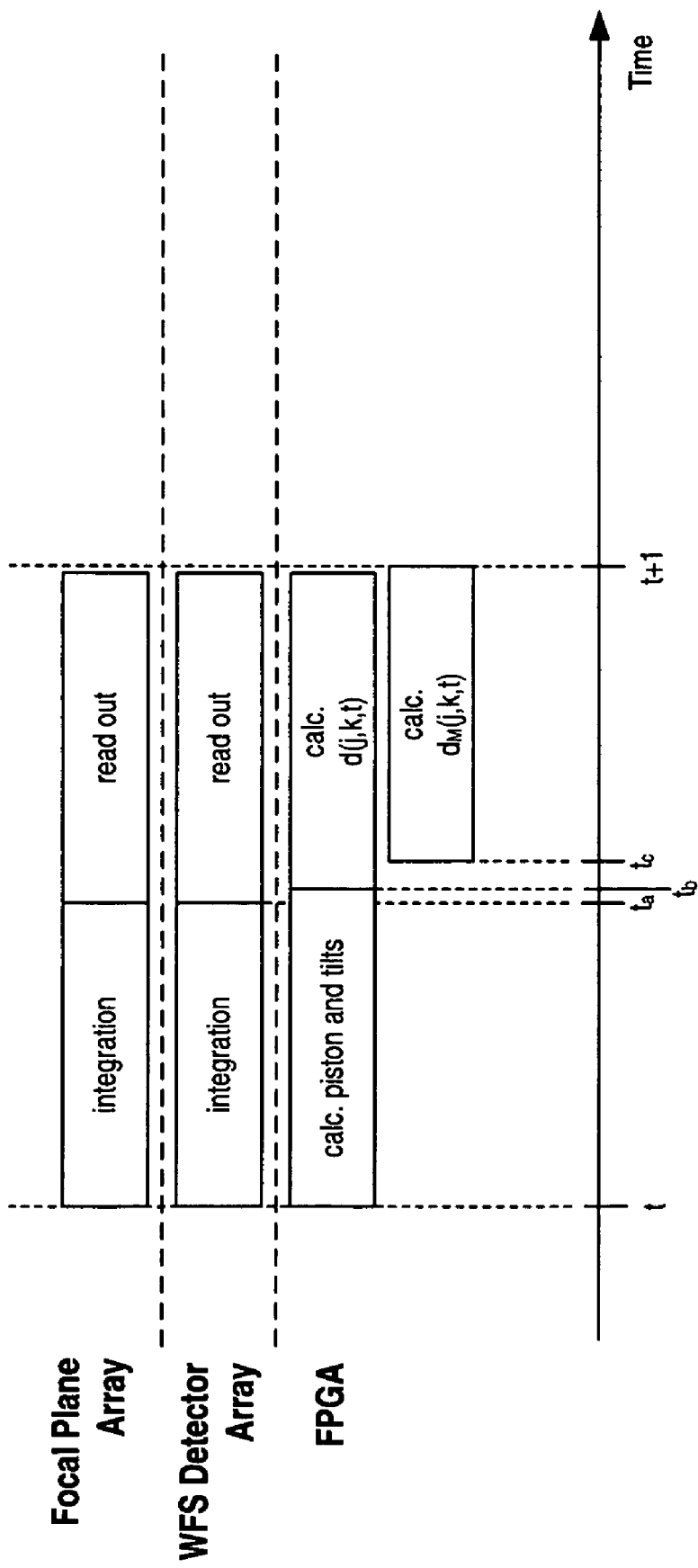
FIG. 14 is a timing diagram for the operation of a single WFS/phase correction device channel in the systems of FIGS. 11A and 11B.

FIG. 14 is a timing diagram for the operation of modal DPCAO system 200 during an imaging frame commencing at an arbitrary time t and ending at time t+1, with times $t_a$ through $t_c$ representing times within that frame. At time t, an integration period for a new imaging frame begins. Light striking focal plane array 27 and detector array 56 causes individual pixels to generate electrical signals based upon the intensity of received light. Integration ends at time $t_a$. Also beginning at time t, FPGA 30 calculates piston and tilts based on $\phi_b(j,k,t-1)|_{-c-p-t}$ for each WFS/DM channel. The piston and tilt calculation ends at time $t_b$. From time $t_a$ through time t+1, data $I_0(j,k,t)$, $I_{\pi/2}(j,k,t)$, $I_\pi(j,k,t)$ and $I_{3\pi/2}(j,k,t)$ is read from each channel of array 56. As that data is read, and using the piston and tilts calculated for the t−1 frame (available at time $t_b$), $d(j,k,t)$ is calculated for each WFS/DM channel. Calculation of $d_M(j,k,t)$ begins at time $t_c$. Also beginning at time $t_c$, $d(j,k,t)$ and $d_M(j,k,t)$ are used to calculate $d_c(j,k,t)|_{GB}$ (not shown in FIG. 14).

Figure 15:
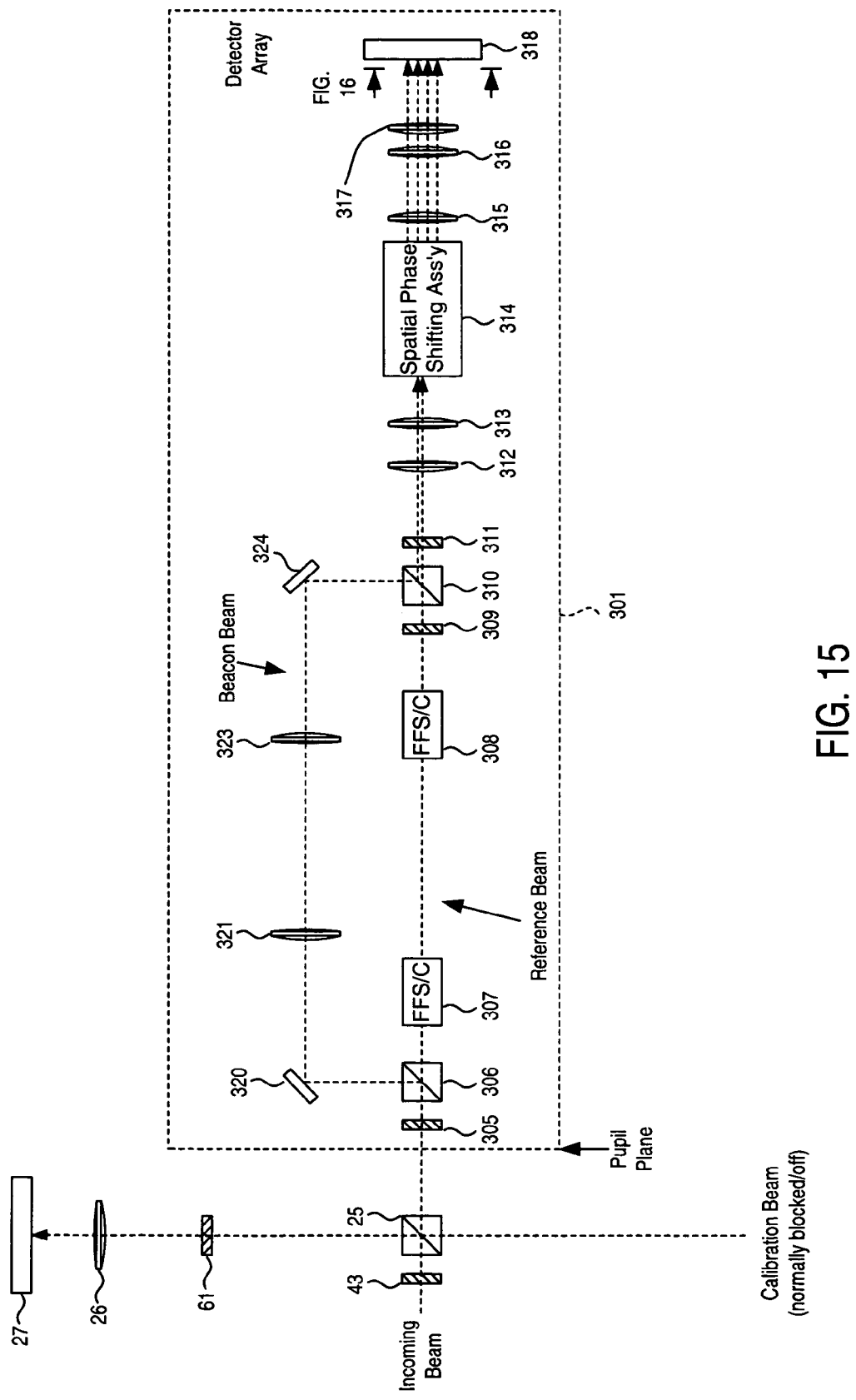
FIG. 15 is a block diagram of a spatial SRI WFS according to at least some embodiments.

In the embodiments described thus far, a temporal phase shifting WFS has been employed. As previously discussed, however, other embodiments employ other types of WFSs. For example, FIG. 15 is a block diagram of a spatial phase shifting SRI WFS 301 which can be used instead of temporally-shifting WFS 31 of FIG. 3. Unlike WFS 31, which obtains values of $I_0(j,k,t)$, $I_{\pi/2}(j,k,t)$, $I_\pi(j,k,t)$ and $I_{3\pi/2}(j,k,t)$ at each pixel (j,k) by sequentially applying π/2 shifts to the reference beam using EOM 58, WFS 301 simultaneously obtains values of $I_0(j,k,t)$, $I_{\pi/2}(j,k,t)$, $I_\pi(j,k,t)$ and $I_{3\pi/2}(j,k,t)$ at each pixel (j,k).

In FIG. 15, an incoming beam from beam splitter 25 (FIG. 1A) is collimated and enters WFS 301. The pupil plane of WFS 301 corresponds to the plane of SM 14 and of DM 21, and is optically conjugate to the output of PBS 306 and PBS 310. The input to WFS 301 is linearly polarized so that power to different components of WFS 301 can be controlled using half wave plates to rotate the polarization and polarizing beam splitters to split the beam. At the input of WFS 301, a sample of the beam is split using PBS 306, with the power of the incoming beam controlled with HWP 305. HWP 305 and PBS 306 control the amount of the beam split between the beacon and reference legs. The beacon beam is reflected by TF 320, through lenses 321 and 323, to TF 324. From 324 the beacon beam is reflected to PBS 310 and brought together with the reference beam. Unlike WFS 31, however, a vertical separation is maintained between the beacon and reference beams at PBS 310. Interference between the beacon and reference beams will not occur until those beams enter spatial phase shifting assembly 314, described below.

The reference beam is created by coupling the other beam exiting PBS 306 to a single mode fiber in a first fiber focusing system/collimator (FFS/C) 307. FFS/C 307 spatially filters the incoming beam to create a DC phase reference beam. From FFS/C, 307 the reference beam passes through a second FFS/C 308; an electro-optic modulator is not used in WFS 301. From FFS/C 308, the reference beam passes through HWP 309 and into PBS 310. The vertically-separated beacon and reference beams exit PBS 310 and pass through HWP 311 and lenses 312 and 313 before entering spatial phase shifting assembly 314. Within spatial phase shifting assembly 314, the beacon and reference beams are each split into four separate beams. The spatial phase shifting assembly 314 leads to interference of the beams with phase shifts of 0, π/2, π and 3π/2 on the beams. The output from spatial phase shifting assembly 314 is thus four sets of interfering beams: (1) the beacon and reference beams, (2) the beacon and a π/2-shifted reference beam, (3) the beacon and a π-shifted reference beam, and (4) the beacon and a 3π/2-shifted reference beam. These four sets of interfering beams pass through lenses 315, 316 and 317, and then strike detector array 318.

Figure 16:
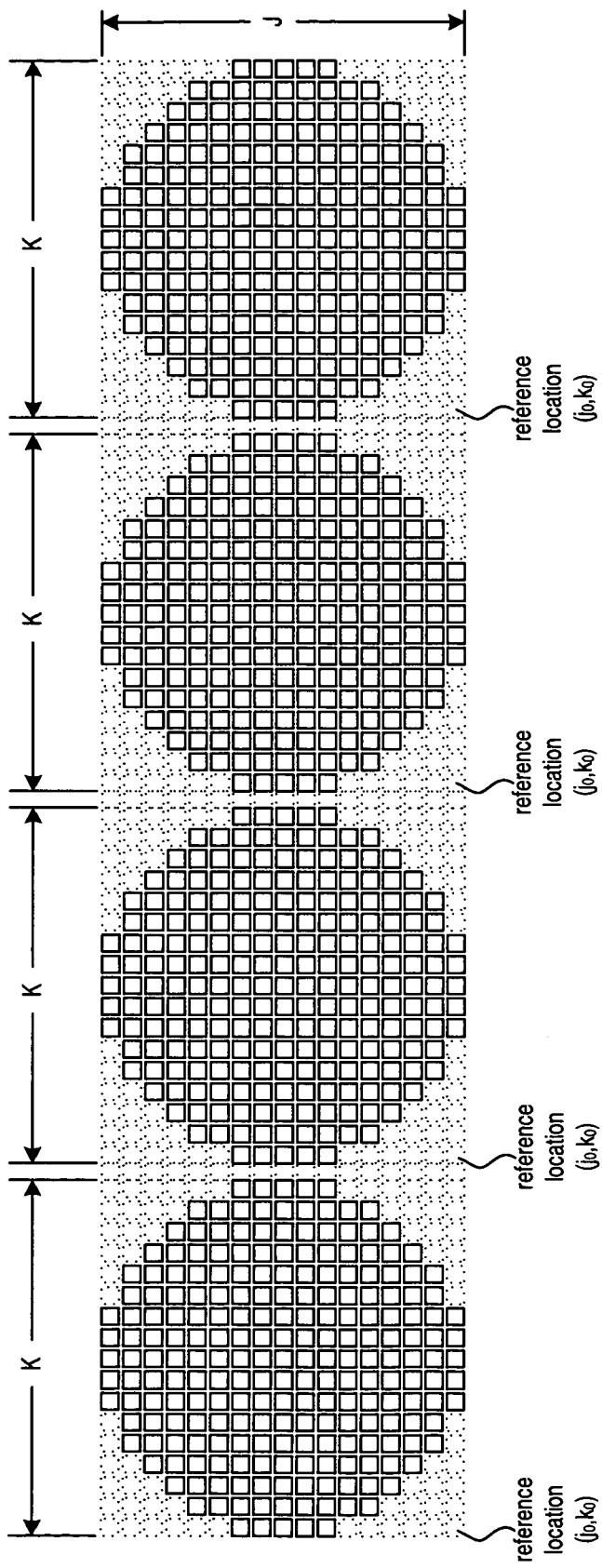
FIG. 16 is a view of a spatial SRI WFS detector array from the position indicated in FIG. 15.

FIG. 16 is a view of a detector array 318 from the position indicated in FIG. 15. Each of the interfering beam pairs from spatial phase shifting assembly 314 falls on a separate region of detector array 318. Each of those four regions is generally similar to detector array 56 of FIGS. 3 and 4. Specifically, each region includes multiple light sensitive pixels outputting signals that vary in response to intensity of received light. Pixels within each of the four regions are also indexed according to the same (j,k) convention previously described, with each region further containing inactive pixels (shown in broken lines) and a reference location $(j_0,k_0)$. Locations within the four regions having the same j and k indices correspond to the same subaperture of an incoming beam, and further correspond to a single control channel (and micro-mirror) of DM 21 (e.g., FIG. 1A). Thus, each channel from WFS 301 is defined to include the outputs from a single pixel from each of the four pixel regions, with each of those four pixels in the channel having the same j and k indices. In this manner, the output from a single channel of WFS 301 can be used by FPGA 30 or FPGA 230 with minimal modification to the logic of an FPGA implementing the algorithm of FIG. 5A or the algorithm of FIG. 12.

Figure 17A:
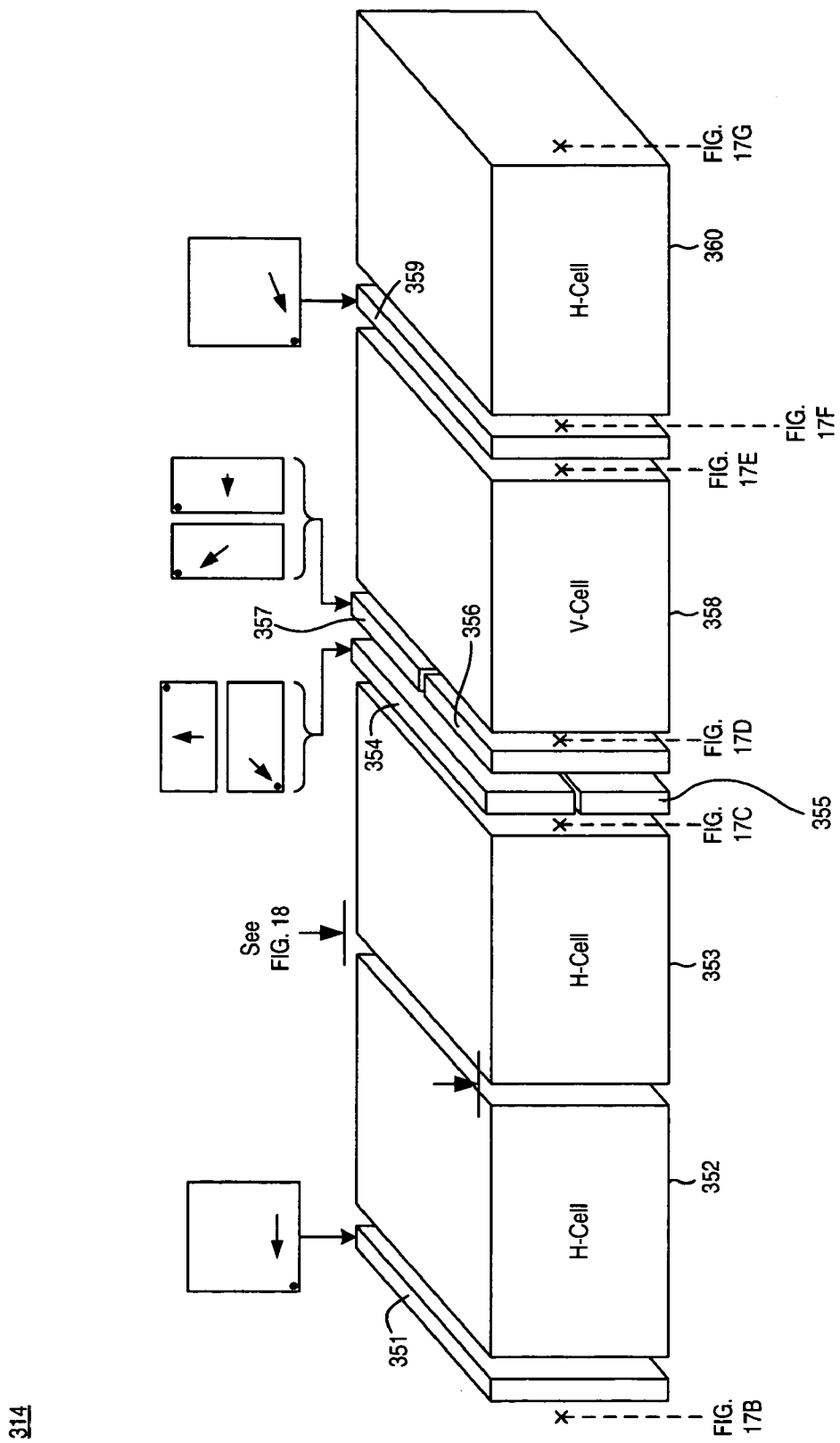
FIG. 17A is block diagram explaining the spatial phase shifting assembly in the spatial SRI WFS of FIG. 15.

The pupil plane at PBS 310 is relayed to the center of spatial phase shifting assembly 314. FIG. 17A is a block diagram providing further details of spatial phase shifting assembly 314. A 0° HWP 351 is located at the entrance to spatial phase shifting assembly 314. For convenience, small boxes point to HWP 351 and other plates in FIG. 17A to schematically indicate polarization. Following HWP 351 are two H-cells 352 and 353. Each H-cell includes birefringent walk-off beam splitters made from, e.g., Calcite or YV04. Further details of H-cells 352 and 353 are provided in FIG. 18. Following H-cell 353 are a 90° HWP 354 covering the upper half of the cross-section of spatial phase shifting assembly 314 and a 45° quarter wave plate (QWP) 355 covering the lower half of that cross-section. A 45° HWP 357 and a 0° HWP 356 follow HWP 354 and QWP 355. HWP 357 is positioned to cover the left side of the spatial phase shifting assembly 314 cross-section, and HWP 356 covers the right side. A V-cell 358 follows HWP 356 and HWP 357. V-cell 358 is similar to H-cells 352 and 353, but is configured to shift beams in the vertical direction. A 22.5° HWP 359 follows V-Cell 358, followed by an H-cell 360.

Figure 17B:
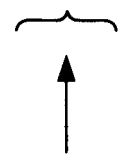
FIGS. 17B-17G show polarization of divided portions of the reference and beacon beams at various locations within the spatial phase shifting assembly of FIG. 17A.
Figure 17B:
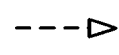
Figure 17C:
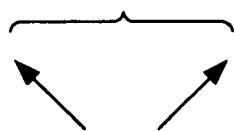
Figure 17D:
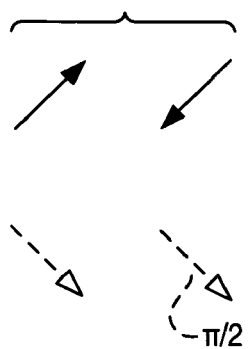
Figure 17E:
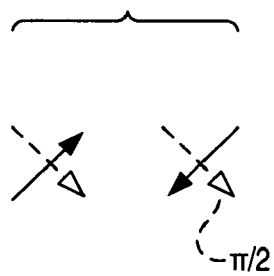
Figure 17F:
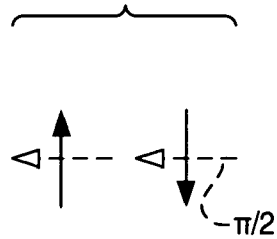
Figure 17G:
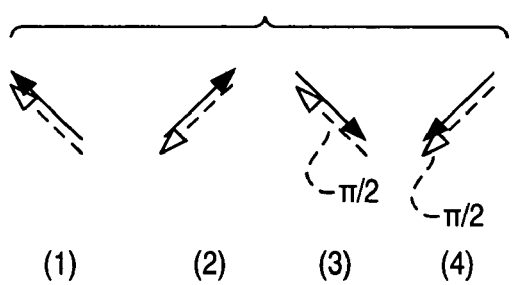

FIGS. 17B through 17G show beam distribution and polarization for the beacon and reference beams at the indicated locations in spatial phase shifting assembly 318. FIG. 17B shows the polarization of the beacon beam (solid arrow) and reference beam (broken line arrow) at the entrance to spatial phase shifting assembly 314. FIG. 17C shows the beams after H-cell 353 and prior to HWP 354 and QWP 355. The beacon and reference beams have each been divided into two horizontally displaced beams with polarizations of 45° relative to FIG. 17B. FIG. 17D shows the beams just prior to V-cell 358. The polarization of one of the beacon beams is changed by 90°, while the polarization of the other beacon beam is changed by 180°. The polarization of one of the reference beams is unchanged, while the polarization of the other is changed by 90° and is phase shifted by $\pi/2$. FIG. 17E shows the beams after exiting V-cell 358. The vertical separation between the reference and beacon beams has been removed. FIG. 17F shows the beams after exiting HWP 359. The polarization of each beacon beam has changed by 45°, and the polarization of each reference beam has changed by 135°. FIG. 17G shows the beams after exiting H-cell 360. Each of the joined reference and beacon beam pair has been separated into two joined beacon and reference beams. For beacon and reference beam pair (1), the reference beam phase is not shifted. In beam pair (2), the reference beam phase is shifted by $\pi$. In beam pair (3), the reference beam phase is shifted by an amount of $3\pi/2$ relative to the beacon beam. In beam pair (4), the reference beam phase is shifted by $\pi/2$ relative to the beacon beam.

Figure 18:
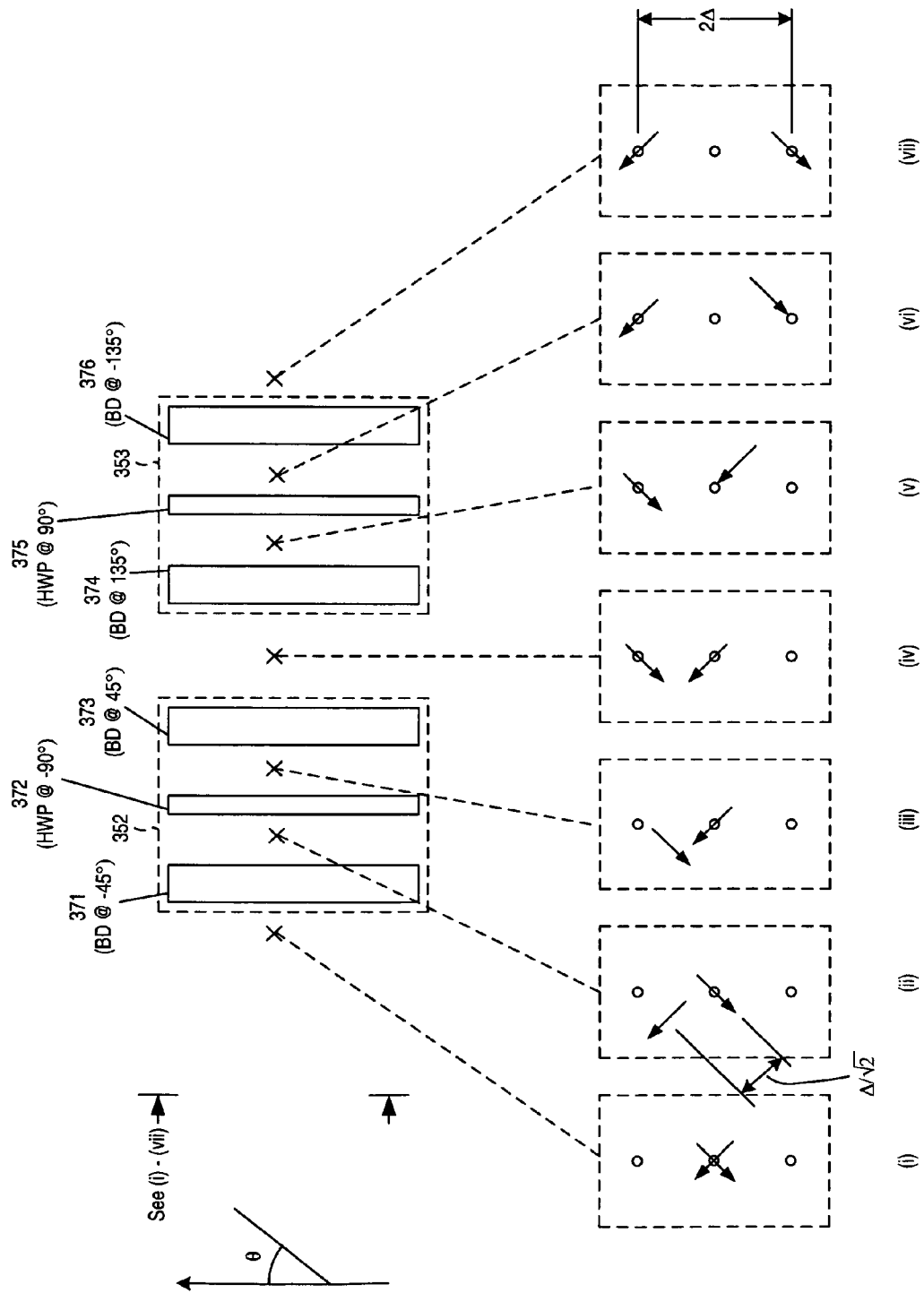
FIG. 18 is a block diagram showing operation of a portion of the spatial phase shifting assembly of FIG. 17A.

FIG. 18 is a block diagram of H-cells 352 and 353 from the position indicated in FIG. 17A. H-cell 352 includes −45° walk-off beam displacer (BD) 371, a −90° HWP 372 and a 45° BD 373. H-cell 353 includes 135° BD 374, a 90° HWP 375 and a −135° BD 376. BDs 371, 373, 374 and 376 are formed from, e.g., calcite or YV04 crystals. Blocks (i) through (vii) in FIG. 18 show how a single beam is affected as it passes through H-cells 352 and 353. The two arrows in blocks (i) through (vii) represent two components of a single beam, and should not be confused with the notation of FIGS. 17B-17G. Each of blocks (i) through (vii) shows the displacement of those components at the indicated location within one of (or between) H-cells 352 and 353. Although details of V-cell 358 and H-cell 360 are not shown, such details are readily appreciated. (and V-cell 358 and H-cell 360 can thus be readily constructed) by persons skilled in the art in view of the information provided herein. Notably, the walk-off beam splitters of the H- and V-cells of spatial phase shifting assembly 314 are arranged to minimize aberrations and to provide degrees of freedom to control output beam separation. This permits alignment of each interfering beam pair exiting assembly 314 with the corresponding one of the four regions shown in FIG. 16. Notably, the pupil plane location of phase shifting assembly 314 can be important, as the wave plate assembly (plates 354-357) at the center of assembly 314 is position dependent.

Figure 19:
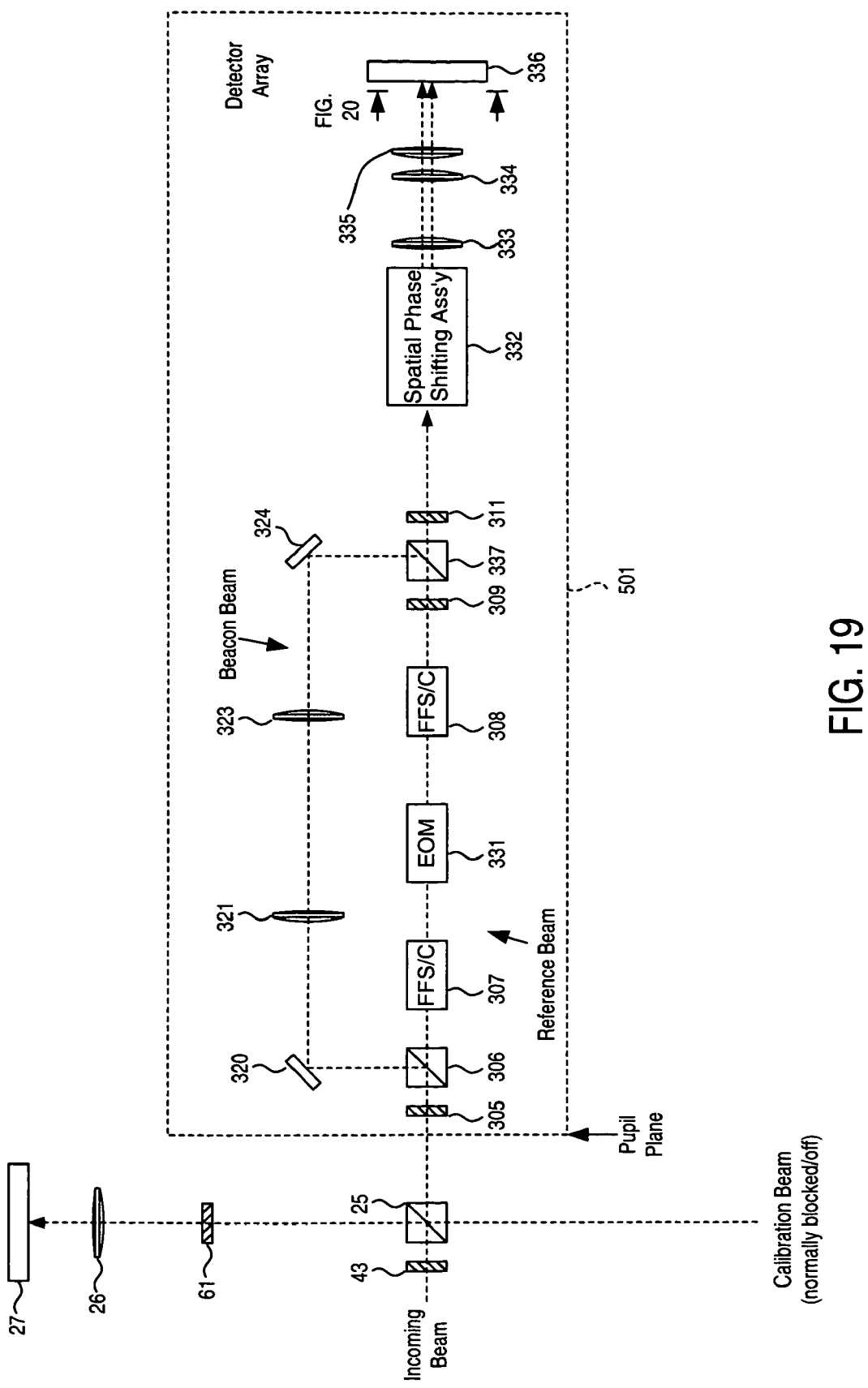
FIG. 19 is a block diagram of a spatio-temporal phase shifting SRI WFS according to at least some embodiments.

In still other embodiments, a spatio-temporal phase shifting self-referencing interferometer WFS is used. A spatio-temporal WFS includes features of the temporal WFS 31 (FIG. 3) and of the spatial WFS 301 (FIG. 15). FIG. 19 is a block diagram showing one example of a spatio-temporal WFS. Like components in FIGS. 15 and 19 having the same reference numbers operate in the same manner, and are thus not further discussed. The incoming beam from beam splitter 25 (FIG. 1A) is collimated and enters WFS 501. The pupil plane of WFS 501 corresponds to the plane of SM 14 and of DM 21, and is optically conjugate to the output of PBS 306 and PBS 337. The input to WFS 501 is linearly polarized so that power to different components of WFS 501 can be controlled using half wave plates to rotate the polarization and polarizing beam splitters to split the beam. Unlike spatial WFS 301 of FIG. 15, spatio-temporal WFS 501 includes an electro-optic modulator (EOM) 331. EOM 331 operates in a manner similar to EOM 58 in temporal WFS 31 (FIG. 3). However, EOM 331 only shifts the reference beam by 0 or by $\pi/2$. The beacon and reference beams are combined with orthogonal polarization in polarizing beam splitter 337. Spatial phase shifting assembly 332 is similar to assembly 314 in spatial WFS 301 (FIG. 15), but only produces two simultaneous interference patterns with nominally a 0 and $\pi$ phase shift. Those two interference patterns strike detector array 336 after passing through lenses 333, 334 and 335. EOM 332 is modulated with a 0 and a $\pi/2$ phase shift on each frame. During the 0 modulation, a pair of interference patterns corresponding to 0 and $\pi$ phase shifts strike detector array 336. During the $\pi/2$ modulation, a pair of interference patterns corresponding to $\pi/2$ and $3\pi/2$ phase shifts strike detector array 336.

Figure 20:
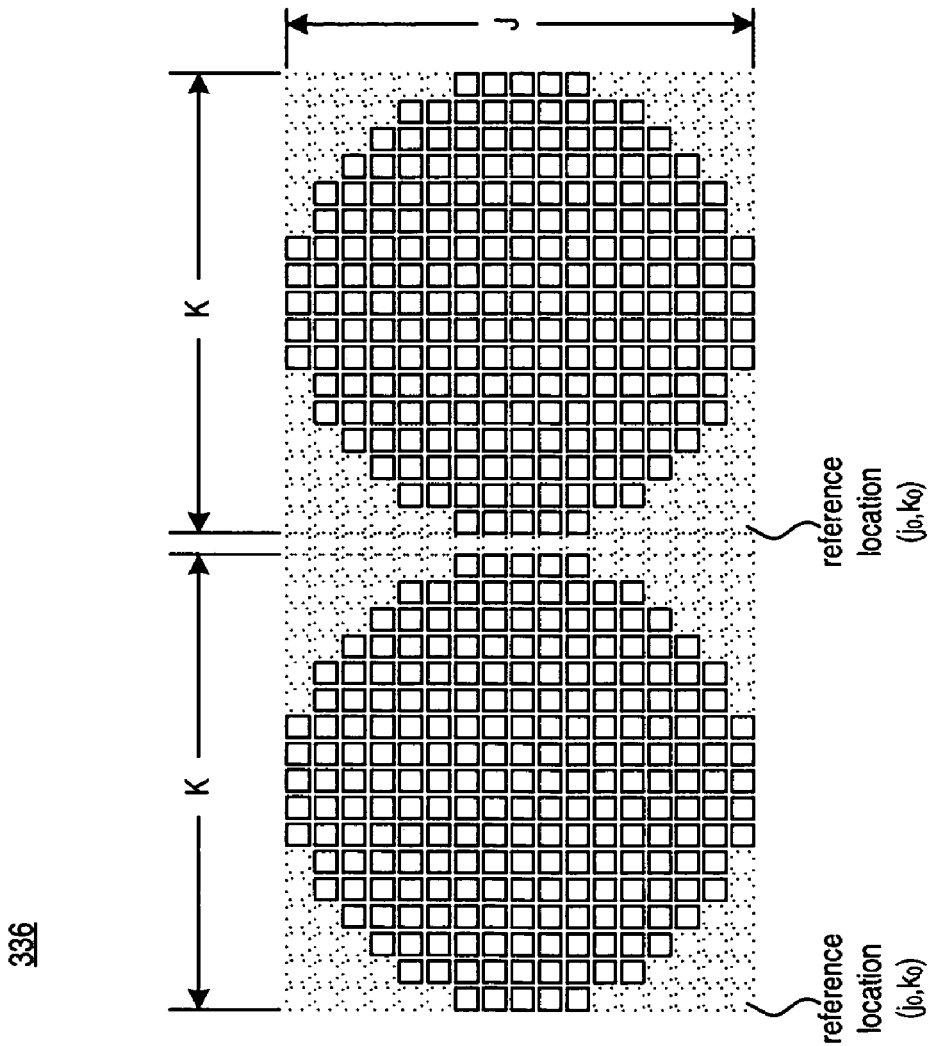
FIG. 20 is a view of a detector array from the position indicated in FIG. 19.

FIG. 20 is a view of a detector array 336 from the position indicated in FIG. 19. Array 336 is generally similar to array 318 of spatial WFS 301 (see FIG. 16), but only includes two pixel regions. Each of those two regions is generally similar to detector array 56 of FIGS. 3 and 4, and includes multiple light sensitive pixels outputting signals that vary in response to intensity of received light. Pixels within each of the two regions of array 336 are also indexed according to the same (j,k) convention previously described, with each region further containing inactive pixels (shown in broken lines) and a reference location $(j_0,k_0)$. Locations within the two regions having the same j and k indices correspond to the same subaperture of an incoming beam, and further correspond to a single control channel (and micro-mirror) of DM 21 (e.g., FIG. 1A). Thus, each channel from WFS 501 is defined to include the outputs from a single pixel from each of the two pixel regions, with each of those two pixels in the channel having the same j and k indices.

Although details of spatial phase shifting assembly 332 are not separately described, constructing such a spatial phase shifting assembly is within the routine ability of a persons skilled in the art once such person is provided with the information herein.

Returning to FIGS. 5, 15 and 19, a calibration laser input is shown for WFS 31, WFS 301 and WFS 501. As previously indicated, a calibration phase $\phi_c(j,k)$ is used to remove the reference phase $(\phi_r(j,k))$ and WFS-induced error phase $(\phi_w(j,k))$ in Equation 12. For WFS 31 (FIG. 3), WFS 301 (FIG. 15) and WFS 501 (FIG. 19), calibration phase $\phi_c(j,k)$ is obtained by first blocking and/or deactivating the incoming beam. The calibration laser (which has been properly boresighted to the beacon beam) is then unblocked and/or activated, and phase is calculated for multiple calibration frames. In the case of WFS 31, for example, the reference beam phase is shifted with EOM 58 through 0, π/2, π and 3π/2 during each calibration frame, and values of $I_0(j,k)$, $I_{\pi/2}(j,k)$, $I_\pi(j,k)$ and $I_{3\pi/2}(j,k)$ obtained for each pixel during each calibration frame. In the case of WFS 301, values for $I_0(j,k)$, $I_{\pi/2}(j,k)$, $I_\pi(j,k)$ and $I_{3\pi/2}(j,k)$ and are obtained simultaneously in each correction frame. In the case of WFS 501, values for $I_0(j,k)$ and $I_\pi(j,k)$ are obtained in the first part of each correction frame, and values for $I_{\pi/2}(j,k)$ and $I_{3\pi/2}(j,k)$ are obtained in the second part of each correction frame.

Using Equations 6 and 7 or the no-divide technique described above (e.g., using a tan M[ ]), a phase $\phi(j,k,f)$ is then obtained for each (j,k) location during each frame, where "f" is an index to the calibration frame. The calibration phase $\phi_c(j,k)$ is then calculated for each (j,k) location of the WFS (whether WFS 31, WFS 301 or WFS 501) using Equations 32 through 32.2.

$$\phi_c(j,k) = \tan^{-1}\left[\frac{\sum_{f=1}^{F} \sin[\phi'(j,k,f)]}{\sum_{f=1}^{F} \cos[\phi'(j,k,f)]}\right] \quad \text{Equation 32}$$

where:
$\phi'(j,k,f)$ is defined by Equation 32.1, and
F is the number of calibration frames.

$$\phi'(j,k,f) = \mathrm{mod}\,[\phi(j,k,f)-p_c(f)+\pi,\,2\pi]-\pi \quad \text{Equation 32.1}$$

where:
$p_c(f)$ is defined by Equation 32.2.

$$p_c(f) = \tan^{-1}\left[\frac{\sum_{j'=1}^{J}\sum_{k'=1}^{K} \sin[\phi(j',k',f)]M(j',k')}{\sum_{j'=1}^{J}\sum_{k'=1}^{K} \cos[\phi(j',k',f)]M(j',k')}\right] \quad \text{Equation 32.2}$$

where:
J and K are the dimensions of the detector array (as shown in FIGS. 4, 16 and 20), and
M(j',k') is a map of ones and zeros identifying active pixels.

As further shown in FIGS. 3, 15 and 19, the calibration laser can also be directed onto focal plane array 27. In this manner, the centroid calculation performed by microprocessor 28 can also be calibrated.

Although examples of carrying out the invention have been described, those skilled in the art will appreciate that there are numerous variations, combinations and permutations of the above described devices and techniques that fall within the spirit and scope of the invention as set forth in the appended claims. For example, an FPGA is not used in some embodiments. Instead, the above-described calculations performed by FPGA 30 or FPGA 230 are performed by one or more microprocessors or other type of computational device. As used in the claims, "controller" generically refers to any of an FPGA, a microprocessor, or one of other types of computational devices. It is to be understood that the subject matter defined in the appended claims is not necessarily limited to the specific features or acts described above. Rather, the specific features and acts described above are disclosed as example forms of implementing the claims. In the claims, various portions are prefaced with letter or number references for convenience. However, use of such references does not imply a temporal relationship not otherwise required by the language of the claims.

APPENDIX

```
% Example MATLAB code for generation of a matrix, G,
% corresponding to the shearing geometry influence function
% matrix. The input mask is assumed to be square.
function [G, indap] = makeG(mask)
m = length(mask);
indap = find(mask);
ap = zeros(m^2, 1);
ap(indap) = 1:length(indap);
ap = reshape(ap,m,m);
ap1x = ap(:,1:m-1);
ap2x = ap(:,2:m);
ap1y = ap(1:m-1,:);
ap2y = ap(2:m,:);
xm = find(ap1x > 0 & ap2x > 0);
ym = find(ap1y > 0 & ap2y > 0);
lxm = length(xm);
lym = length(ym);
j = [ap1x(xm)
     ap2x(xm)
     ap1y(ym)
     ap2y(ym)];
i = [(1:lxm)'
     (1:lxm)'
     (lxm+1:lym+lxm)'
     (lxm+1:lym+lxm)'];
S = [-ones (lxm,1)
      ones (lxm,1)
     -ones (lym,1)
      ones (lym,1)];
G = sparse (i,j,s);
return
```

The invention claimed is:

1. An adaptive optical system to compensate for the effects of turbulence in a beam, comprising:
 a steering mirror movable about one or more tilt axes;
 a phase correction device positioned to receive an incoming beam after relay by the steering mirror, wherein
  the beam has a cross-section that includes multiple subapertures,
  the phase correction device includes a plurality of phase correction elements,
  each of the phase correction elements corresponds to a different one of the subapertures, and
  each of the phase correction elements is positioned to induce phase corrections in its corresponding subaperture;
 a wavefront sensor (WFS) positioned to receive the incoming beam after correction by the phase correction device, the WFS including a plurality of WFS output channels, each of the WFS output channels corresponding to a different one of the subapertures; and
 at least one controller configured to perform steps that include
  (a) receiving data on the WFS output channels, and
  (b) calculating, for each of the subapertures and based on the data received in step (a), a phase correction to be induced by the phase correction element corresponding to that subaperture, and wherein
  each of the WFS output channels corresponds to a single one of the phase correction elements,
  steps (a) and (b) are performed during a current frame period, and the at least one controller is configured to perform step (b) by performing steps that include subtracting a piston, wherein the piston is calculated based on data received on the WFS output channels during a frame period prior to the current frame period and without use of data received on the WFS output channels during the current frame period.

2. The system of claim 1, wherein the system is adapted to compensate for the effects of turbulence in an incoming laser beam.

3. The system of claim 2, farther comprising a focal plane array positioned to receive the incoming beam, and wherein the at least one controller is configured to perform steps that include:
   (c) calculating a centroid for an image formed by the incoming beam on the focal plane array, and
   (d) generating tilt commands, based on the calculated centroid, for moving the steering mirror about the one or more tilt axes.

4. The system of claim 1, wherein the at least one controller is configured to perform step (b) by performing steps that include subtracting a tilt, wherein the tilt is calculated based on data received on the WFS output channels during a frame period prior to the current frame period and without use of data received on the WFS output channels during the current frame period.

5. The system of claim 2, wherein the at least one controller is configured to perform step (b) by performing steps that include:
   (b1) calculating first and second look-up table indices based on data received on the WFS output channel, and
   (b2) obtaining a phase error value from the look-up table using the first and second indices.

6. The system of claim 2, wherein the at least one controller is configured to perform step (b) by calculating phase errors modulo-$2\pi$.

7. The system of claim 6, wherein the at least one controller is configured to perform step (b) by performing steps that include phase wrapping a calculated phase correction with a hysteresis.

8. The system of claim 7, wherein the at least one controller is configured to perform the phase wrapping with a hysteresis by performing steps that include:
   (b1) subtracting $2\pi$ from the calculated phase correction only if the calculated correction is greater than a preselected value between $\pi$ and $2\pi$, and
   (b2) adding $2\pi$ to the calculated phase correction only if the calculated correction is less than a preselected value between $-\pi$ and $-2\pi$.

9. The system of claim 2, wherein the at least one controller is configured to perform step (b) by performing steps that include temporally filtering a calculated phase correction.

10. The system of claim 2, wherein the WFS is a spatial WFS.

11. An adaptive optical system to compensate for the effects of turbulence in a beam, comprising:
   a steering mirror movable about one or more tilt axes;
   a phase correction device positioned to receive an incoming laser beam after relay by the steering mirror, wherein
      the laser beam has a cross-section that includes multiple subapertures,
      the phase correction device includes a plurality of phase correction elements,
      each of the phase correction elements corresponds to a different one of the subapertures, and
      each of the phase correction elements is positioned to induce phase corrections in its corresponding subaperture;
   a wavefront sensor (WFS) positioned to receive the incoming laser beam after correction by the phase correction device, the WFS including a plurality of WFS output channels, each of the WFS output channels corresponding to a different one of the subapertures; and
   at least one controller configured to perform steps that include
      (a) receiving data on the WFS output channels, and
      (b) calculating, for each of the subapertures and based on the data received in step (a), a phase correction to be induced by the phase correction element corresponding to that subaperture, and wherein the at least one controller is configured to perform step (b) by performing steps that include temporally filtering a calculated phase correction according to the equation $$d(j,k,t)=a*\phi(j,k,t)+b*d(j,k,t-1)$$

wherein:
   $d(j,k,t)$ is a temporally filtered phase correction, during a frame period at time t, for the subaperture having a location of j,k in the beam cross-section,
   $d(j,k,t-1)$ is a phase correction, during a previous frame period, for the subaperture having the j,k location
   $\phi(j,k,t)$ is a phase error for the subaperture having the j,k location during the frame period at time t,
   $a=K_{DC}(1-b)$,
   b is between about 0.9 and about 0.95, and
   $K_{DC}$ is a desired system gain.

12. A method of compensating for the effects of turbulence in a beam, comprising the steps of:
   (a) receiving an incoming laser beam at a steering mirror, the incoming laser beam having a cross-section that includes multiple subapertures;
   (b) relaying the incoming laser beam from the steering mirror to a phase correction device having a plurality of phase correction elements, each of the phase correction elements corresponding to, and positioned to induce phase corrections in, a different one of the sub apertures;
   (c) relaying the incoming laser beam from the phase correction device to a wavefront sensor (WFS) having a plurality of output channels, each of the WFS output channels corresponding to a different one of the subapertures;
   (d) receiving data on each of the WFS output channels; and
   (e) computing, for each of the subapertures and based on the data received in step (d), a phase correction to be induced by the phase correction element also corresponding to that subaperture wherein step (e) comprises the steps of
      (e1) calculating first and second indices to a look-up table based on data received on the WFS output channel,
      (e2) obtaining a phase error value from the look-up table using the first and second indices, and
      (e3) subtracting a calibration phase associated with the WFS output channel corresponding to the subaperture.

13. The method of claim 12, wherein steps (a) through (e) are performed during a current frame period, and wherein step (e) comprises the steps of:
   (e4) subtracting a piston value, wherein the subtracted piston value is based on data output on the WFS output channels during a frame period prior to the current frame period, and (e5) subtracting a tilt value, wherein the subtracted tilt value is based on data output on the WFS output channels during a frame period prior to the current frame period.

14. The method of claim 13, wherein step (e) comprises the step of:
(e6) phase wrapping a calculated phase correction with a hysteresis.

15. The method of claim 13, wherein step (e) comprises the step of:
(e6) temporally filtering a calculated phase correction.

16. The method of claim 13, wherein step (e) comprises the steps of:
(e6) phase wrapping a calculated phase correction with a hysteresis, and
(e7) temporally filtering a calculated phase correction.

17. An adaptive optical system to compensate for the effects of turbulence in a laser beam, comprising:
a steering mirror movable about multiple tilt axes and positioned to relay an incoming laser beam, the beam having a cross-section that includes multiple subapertures;
a phase correction device positioned to receive the beam after relay by the steering mirror, wherein
the phase correction device includes a plurality of phase correction elements,
each of the phase correction elements corresponds to a different one of the subapertures, and
each of the phase correction elements is positioned to induce phase corrections in its corresponding subaperture;
a wavefront sensor (WFS) positioned to receive the incoming beam after correction by the phase correction device, the WFS including a plurality of WFS output channels, each of the output WFS channels corresponding to a different one of the subapertures;
a focal plane array positioned to receive the incoming beam; and
at least one controller configured to perform steps during a frame period that include
(a) calculating a centroid for an image formed on the focal plane array by the incoming beam,
(b) generating tilt commands, based on the calculated centroid, for moving the steering mirror about the multiple tilt axes,
(c) receiving data on the WFS output channels,
(d) correcting data received in step (c) for gain and bias of the WFS,
(e) for each WFS output channel, calculating first and second indices to a look-up table based on the corrected data of step (d),
(f) for each WFS output channel, obtaining a phase error value from the look-up table using the first and second indices calculated in step (e),
(g) for each WFS output channel, subtracting a calibration phase associated with that WFS output channel,
(h) calculating a piston based on the data received in step (c),
(i) for each WFS output channel, subtracting a piston calculated during performance of step (h) for a previous frame period,
(j) for each WFS output channel, subtracting tilts calculated during a previous frame period based on data from the WFS during the previous frame period,
(k) for each WFS output channel, temporally filtering according to the equation $$d(j,k,t)=a*\phi(j,k,t)+b*d(j,k,t-1)$$

wherein
$d(j,k,t)$ is a temporally filtered phase correction for the subaperture corresponding to the WFS output channel for the frame period,
$d(j,k,t-1)$ is a phase correction, for the subaperture corresponding to the WFS output channel, for a previous frame period,
$\phi(j,k,t)$ is a phase error computed as a result of performing steps (d) through (g), (i) and (j),
$a=K_{DC}(1-b)$,
b is between about 0.90 and about 0.95, and
$K_{DC}$ is a desired system gain, and
(l) correcting the result of step (k) for gain and offset of the phase correction device.

* * * * *

UNITED STATES PATENT AND TRADEMARK OFFICE
CERTIFICATE OF CORRECTION

PATENT NO. : 7,402,785 B2  
APPLICATION NO. : 11/341564  
DATED : July 22, 2008  
INVENTOR(S) : Jeffrey Daniel Barchers It is certified that error appears in the above-identified patent and that said Letters Patent is hereby corrected as shown below:

Title Page;  
In the References Cited section (56) under Other Publications (Page 2, Column 2, Line 31):  
    Please replace "Applcations" with --Applications--.

In the References Cited section (56) under Other Publications:  
    Please insert NPL reference --International Search Report and Written Opinion for PCT/US07/00543 dated March 19, 2008--.

In Column 24, Claim 12, Line 10:  
    Please replace "sub apertures" with --subapertures--.

Signed and Sealed this

Fourteenth Day of July, 2009

JOHN DOLL  
*Acting Director of the United States Patent and Trademark Office*